US007065759B2

(12) United States Patent
Hank

(10) Patent No.: US 7,065,759 B2
(45) Date of Patent: Jun. 20, 2006

(54) SYSTEM AND METHOD FOR ASSIGNING BASIC BLOCKS TO COMPUTER CONTROL FLOW PATHS

(75) Inventor: Richard Eugene Hank, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 602 days.

(21) Appl. No.: 10/175,233

(22) Filed: Jun. 18, 2002

(65) Prior Publication Data

US 2003/0233642 A1  Dec. 18, 2003

(51) Int. Cl.
  *G06F 9/45*  (2006.01)
(52) U.S. Cl. ........................... 717/156; 717/154
(58) Field of Classification Search ........ 717/168–178, 717/154, 156; 712/236; 719/313
See application file for complete search history.

(56) References Cited

U.S. PATENT DOCUMENTS

| 5,889,999 | A | * | 3/1999 | Breternitz et al. ........... 717/158 |
| 5,937,195 | A | | 8/1999 | Ju et al. |
| 5,943,499 | A | | 8/1999 | Gillies et al. |
| 5,966,536 | A | * | 10/1999 | Ravichandran .............. 717/153 |
| 5,978,588 | A | * | 11/1999 | Wallace ....................... 717/159 |
| 6,006,033 | A | * | 12/1999 | Heisch ......................... 717/158 |
| 6,260,190 | B1 | * | 7/2001 | Ju ................................ 717/156 |
| 6,289,507 | B1 | * | 9/2001 | Tanaka et al. ............... 717/155 |
| 6,381,740 | B1 | * | 4/2002 | Miller et al. ................. 717/151 |
| 6,594,824 | B1 | * | 7/2003 | Volkonsky et al. .......... 717/159 |
| 6,611,956 | B1 | * | 8/2003 | Ogawa et al. ............... 717/152 |
| 6,817,013 | B1 | | 11/2004 | Tabata et al. |
| 2002/0056078 | A1 | * | 5/2002 | Inagaki et al. ............... 717/155 |
| 2002/0078436 | A1 | * | 6/2002 | Clarke ......................... 717/155 |
| 2002/0095666 | A1 | * | 7/2002 | Tabata et al. ................ 717/149 |
| 2003/0066061 | A1 | * | 4/2003 | Wu et al. ..................... 717/158 |

OTHER PUBLICATIONS

Scott A. Mahlke, "Exploiting Instruction-Level Parallelism in the Presence of Conditional Branches"; Thesis, pp. 1-277; University of Illinois 1996; [retrieved on Jun. 18, 2002],retrieved from the internet: http://www.crhc.uiuc.edu/IMPACT/ftp/report/phd-thesis-scott-mahlke.pdf.

(Continued)

Primary Examiner—Wei Zhen
Assistant Examiner—Mulubrhan Tecklu

(57) ABSTRACT

A method for selecting a basic block in a computer program comprising providing a computer program including an entry basic block and a plurality of basic blocks forming control flow paths, determining that immediate subsets of the control flow paths commencing with the entry basic block are essentially unbiased subsets, determining that the basic blocks in the immediate subsets of the flow control paths have essentially the same height, and selecting any one of the basic blocks in the immediate subsets of the flow control flow paths. The height may be a height selected from the group of heights consisting of resource height and dependence height. An article of manufacture including a computer-readable medium having instructions for selecting a basic block or for forming a new computer control flow path. A computer system comprising a computer program having instructions for selecting a basic block or for forming a new computer control flow path.

50 Claims, 11 Drawing Sheets

OTHER PUBLICATIONS

David I. August, et al. "A Framework for Balancing Control Flow and Predication"; pp. 1-12, Dec. 1997; [retrieved on Jun. 18, 2002] retrieved from the internet:http:www.crhc.uiuc.edu/IMPACT/ftp/conference/micro-97-framework.pdf.

"The Impact of If-Conversion and Branch Prediction on Program Execution on the Intel® Itanium™ Processor" by Y. Choi, et al. Intel Corp. 2001, IEEE. Proc. of the 34th ACM/IEEE International Symposium on Microarchitecture, Austin, TX. pp. 182-191.

"Using Profiling to Reduce Branch Misprediction Costs on a Dynamically Scheduled Processor" by S. Mantripragada, et al. Silicon Graphics, Inc. ACM Press, 2000. Proc. of the 14h International Conference on Supercomputing (ICOS 2000), Santa Fe, NM. pp. 206-214.

* cited by examiner

SYSTEM AND METHOD FOR ASSIGNING BASIC BLOCKS TO COMPUTER CONTROL FLOW PATHS

BACKGROUND OF THE INVENTION

1. Field of the Invention

Embodiments of the present invention relate generally to computer systems. More particularly, embodiments of the present invention relate to a system and method for assigning basic blocks to computer control flow paths of a computer program in a computer-based environment.

2. Description of the Background Art

Work has been performed in the area of predicated execution for computer programs. A published algorithm for branch elimination exists in a Ph.D, dissertation entitled *Exploiting Instruction-Level Parallelism in the Presence of Conditional Branches* to Scott A. Mahlke, Department of Electrical and Computer Engineering, University of Illinois, Urbana, Ill., September, 1996, fully incorporated herein by reference thereto. The object of Mahlke's approach is to merge as many control flow paths together to form "hyperblocks" that are as large as possible. A "Hyperblock", as defined by Mahlke, is a collection of connected basic blocks in which control may only enter through the first block, referred to as the entry block. Control flow may leave from any number of blocks in the hyperblock. All control flow between basic blocks in a hyperblock is removed via if-conversion. The goal of hyperblocks is to intelligently group basic blocks from many different control flow paths into a single manageable block for compiler optimization and scheduling. The formation of hyperblocks is necessary for Mahlke's approach because the IMPACT compiler in which Mahlke's approach was implemented does not contain an instruction scheduler capable of cross basic block code motion.

In order to achieve a desired combined path, Mahlke's algorithm actually enumerates all possible control flow paths through the scheduling region of the computer program and computes a priority function for each control flow path. A disadvantage to Mahlke's approach is that it has to find all possible control flow paths, the number of which is proportional to the square of the number of split or bifurcation points in the region.

Another disadvantage of Mahlke's approach is that his aggressive if-conversion routine actually results in an over subscription of computer resources. As an attempt to solve this problem, David I. August, Wen-mei W. Hwu, and Scott A. Mahlke, in an article entitled *A Framework for Balancing Control Flow and Predication,* published for the Proceedings of the 30$^{th}$ International Symposium on Microarchitecture, December, 1997, and fully incorporated herein by reference thereto, propose a technique that involves iteratively removing control flow paths and rescheduling hyperblocks until the resources are no longer over subscribed. Such a computer technique is computer-time consuming and is therefore not practical.

SUMMARY OF EMBODIMENTS OF THE INVENTION

Embodiments of the present invention provide a method for selecting a basic block in a computer program comprising providing a computer program including an entry basic block and a plurality of basic blocks forming control flow paths, determining that immediate subsets of the control flow paths commencing with the entry basic block are biased subsets, and selecting a most frequent successive basic block in a most biased subset of the control flow paths to produce a selected basic block.

Embodiments of the present invention also provide a method for selecting a basic block in a computer program comprising providing a computer program including an entry basic block and a plurality of basic blocks forming control flow paths, determining that immediate subsets of the control flow paths commencing with the entry basic block are essentially unbiased subsets, and selecting a basic block with the shortest height to produce a selected basic block. The height may be a height selected from the group of heights consisting of resource height and dependence height. The method may additionally comprise determining that a basic block in one control flow path has a shorter resource height, and determining that a basic block in another control flow path has a shorter dependence height. In one embodiment of the invention the selected basic block comprises the basic block having the shorter resource height.

Further embodiments of the present invention provide a method for selecting a basic block in a computer program comprising providing a computer program including an entry basic block and a plurality of basic blocks forming control flow paths, determining that immediate subsets of the control flow paths commencing with the entry basic block are essentially unbiased subsets, determining that the basic blocks in the immediate subsets of the flow control paths have essentially the same height, and selecting any one of the basic blocks in the immediate subsets of the flow control flow paths. The height may be a height selected from the group of heights consisting of resource height and dependence height.

Embodiments of the present invention further also provide a method for selecting a basic block in a computer program comprising providing a computer program including an entry basic block, and a plurality of basic blocks forming control flow paths. The method further comprises selecting a basic block from the entry basic block in accordance with an if-instruction selected from the group of if-instructions consisting of:

(i) if immediate subsets of control flow paths commencing with the entry basic block are biased subsets, select a most frequent successive basic block in a most biased subset of the control flow paths to produce a selected basic block;

(ii) if immediate subsets of control flow paths commencing from the entry basic block are essentially unbiased subsets, select a basic block with the shortest height to produce a selected basic block;

(iii) if immediate subsets of control flow paths commencing from the entry basic block are essentially unbiased subsets, and if the basic blocks in the immediate subsets of flow control flow paths have essentially the same height, select any one of the basic blocks in the immediate subsets of the flow control flow paths; and (iv) if immediate subsets of control flow paths commencing from the entry basic block contain no basic block selected in accordance with the if-instruction of subparagraph (i) or the if-instruction of subparagraph (ii) or the if-instruction of subparagraph (iii), select a basic block (e.g., a frequently executed or a most frequently executed basic block) not assigned in any immediate subset of the control flow paths to produce a selected basic block. A basic block produced in accordance with this method is also provided under embodiments of the present invention.

Another further embodiment of the present invention provides a method for forming a computer control flow path in a computer program comprising the steps:

(a) providing a computer program having a plurality of basic blocks forming control flow paths; and (b) selecting a basic block in accordance with an if-instruction selected from the group of if-instructions consisting of:

(i) if immediate subsets of control flow paths commencing from one of the basic blocks are biased subsets, select a most frequent successive basic block in a most biased subset of the control flow paths to produce a selected basic block;

(ii) if immediate subsets of control flow paths commencing from one of the basic blocks are essentially unbiased subsets, select a basic block with the shortest height to produce a selected basic block;

(iii) if immediate subsets of control flow paths commencing from one of basic blocks are essentially unbiased subsets, and if the basic blocks in the immediate subsets of flow control flow paths have essentially the same height, select any one of the basic blocks in the immediate subsets of the flow control flow paths; and (iv) if immediate subsets of control flow paths commencing from one of the basic blocks contain no basic block selected in accordance with the if-instruction of subparagraph (i) or the if-instruction of subparagraph (ii) or the if-instruction of subparagraph (iii), select a basic block (e.g., a frequently executed or a most frequently executed basic block) not assigned in any immediate subset of the control flow paths. The method may further comprise repeating step (b) to produce a plurality of selected basic blocks and form a computer flow control path. A computer program flow path produced in accordance with one or features of this method is also provided under embodiments of the present invention.

Additional embodiments of the present invention provide an article of manufacture comprising a computer-readable medium having instructions for selecting in a computer program having control flow paths a basic block from an entry basic block in accordance with an if-instruction selected from the group of if-instructions consisting of:

(i) if immediate subsets of control flow paths commencing with the entry basic block are biased subsets, select a most frequent successive basic block in a most biased subset of the control flow paths to produce a selected basic block;

(ii) if immediate subsets of control flow paths commencing from the entry basic block are essentially unbiased subsets, select a basic block with the shortest height to produce a selected basic block;

(iii) if immediate subsets of control flow paths commencing from the entry basic block are essentially unbiased subsets, and if the basic blocks in the immediate subsets of flow control flow paths have essentially the same height, select any one of the basic blocks in the immediate subsets of the flow control flow paths; and (iv) if immediate subsets of control flow paths commencing from the entry basic block contain no basic block selected in accordance with the if-instruction of subparagraph (i) or the if-instruction of subparagraph (ii) or the if-instruction of subparagraph (iii), select a basic block not assigned in any immediate subset of the control flow paths to produce a selected basic block.

Embodiments of the present invention also include an article of manufacture comprising a computer-readable medium having instructions for (a) selecting, from a computer program having a plurality of basic blocks forming control flow paths, a basic block in accordance with an if-instruction selected from the group of if-instructions consisting of:

i) if immediate subsets of control flow paths are biased subsets, select a most frequent successive basic block in a most biased subset of the control flow paths to produce a selected basic block;

(ii) if immediate subsets of control flow paths are essentially unbiased subsets, select a basic block with the shortest height to produce a selected basic block;

(iii) if immediate subsets of control flow paths commencing are essentially unbiased subsets, and if the basic blocks in the immediate subsets of flow control flow paths have essentially the same height, select any one of the basic blocks in the immediate subsets of the flow control flow paths; and (iv) if immediate subsets of control flow paths contain no basic block selected in accordance with the if-instruction of subparagraph (i) or the if-instruction of subparagraph (ii) or the if-instruction of subparagraph (iii), select a basic block not assigned in any immediate subset of the control flow paths.

(b) repeating the selecting step of paragraph (a) to produce a plurality of selected basic blocks and form a new computer flow control path.

Further additional embodiments of the present invention comprise a computer system comprising a computer program having flow control paths and a selected basic block selected from an entry basic block in accordance with an if-instruction selected from the group of if-instructions consisting of:

(i) if immediate subsets of control flow paths commencing with the entry basic block are biased subsets, select a most frequent successive basic block in a most biased subset of the control flow paths to produce a selected basic block;

(ii) if immediate subsets of control flow paths commencing from the entry basic block are essentially unbiased subsets, select a basic block with the shortest height to produce a selected basic block;

(iii) if immediate subsets of control flow paths commencing from the entry basic block are essentially unbiased subsets, and if the basic blocks in the immediate subsets of flow control flow paths have essentially the same height, select any one of the basic blocks in the immediate subsets of the flow control flow paths; and (iv) if immediate subsets of control flow paths commencing from the entry basic block contain no basic block selected in accordance with the if-instruction of subparagraph (i) or the if-instruction of subparagraph (ii) or the if-instruction of subparagraph (iii), select a basic block not assigned in any immediate subset of the control flow paths to produce a selected basic block.

A computer system is also included within the spirit and scope of embodiments of the present invention. The computer system may comprise a computer program including a computer flow control path formed from a plurality of selected basic blocks having been selected in accordance with an if-instruction selected from the group of if-instructions consisting of:

(i) if immediate subsets of control flow paths are biased subsets, select a most frequent successive basic block in a most biased subset of the control flow paths to produce a selected basic block;

(ii) if immediate subsets of control flow paths are essentially unbiased subsets, select a basic block with the shortest height to produce a selected basic block;

(iii) if immediate subsets of control flow paths commencing are essentially unbiased subsets, and if the basic blocks in the immediate subsets of flow control flow paths have essentially the same height, select any one of the basic blocks in the immediate subsets of the flow control flow paths; and (iv) if immediate subsets of control flow paths contain no basic block selected in accordance with the if-instruction of subparagraph (i) or the if-instruction of subparagraph (ii) or the if-instruction of subparagraph (iii), select a basic block not assigned in any immediate subset of the control flow paths.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

DETAILED DESCRIPTION OF EMBODIMENTS OF THE INVENTION

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may be any processor-containing device, such as a mainframe computer, a personal computer, a laptop, a notebook, a microcomputer, a server, or any of the like. A "computer program" may be any suitable program or sequence of coded instructions which are to be inserted into a computer, well know to those skilled in the art. Stated more specifically, a computer program is an organized list of instructions that, when executed, causes the computer to behave in a predetermined manner. A computer program contains a list of ingredients (called variables) and a list of directions (called statements) that tell the computer what to do with the variables. The variables may represent numeric data, text, or graphical images.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Figure 1:
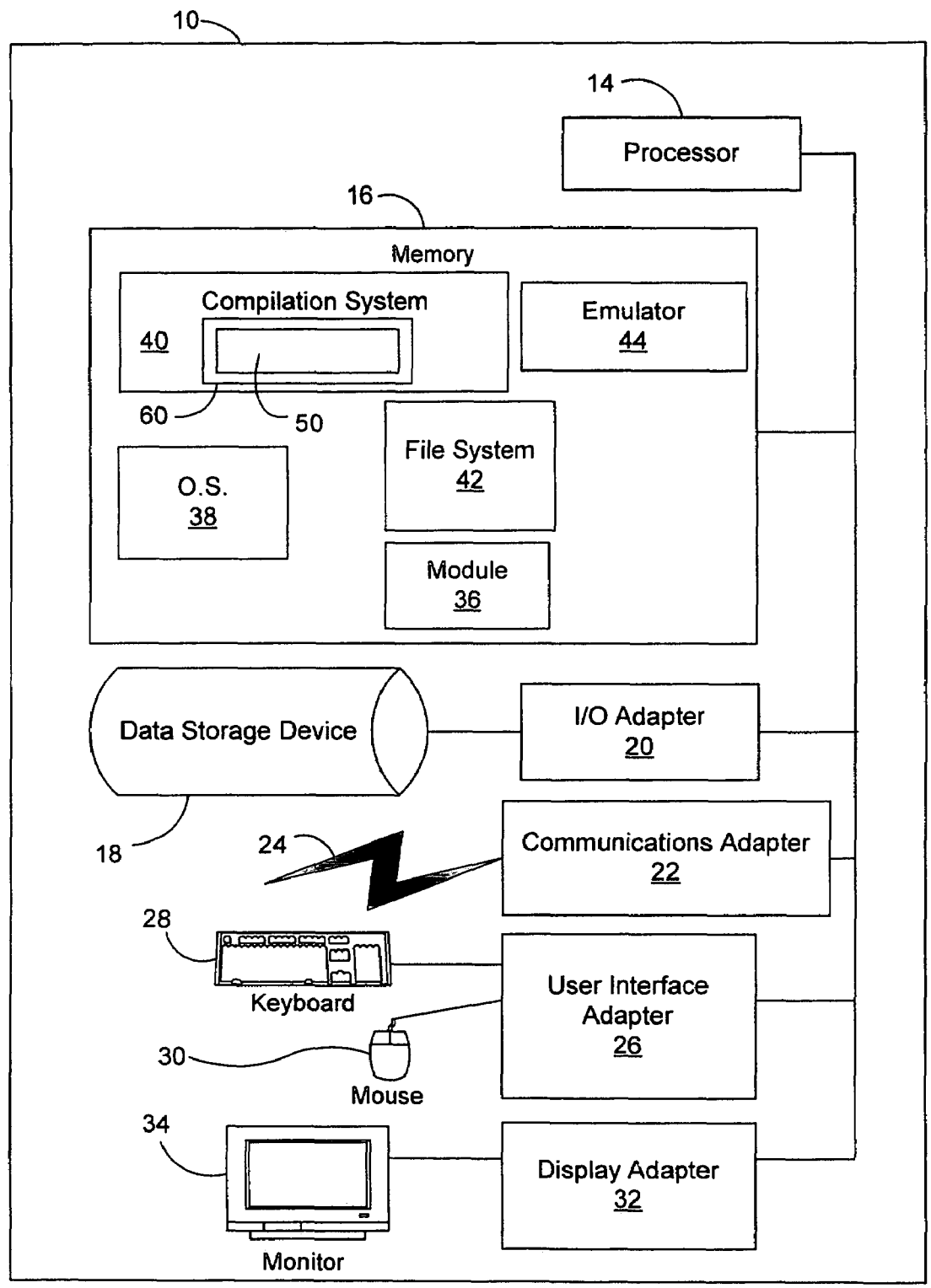
FIG. 1 is a schematic block diagram that exemplarily illustrates a computer system.

Referring now to FIG. 1 there is broadly illustrated a computer system 10 for various embodiments of the present invention. The computer system 10 includes a computer program and various components, such as a processor 14, a computer memory 16, a data storage device 18, an input/output (I/O) adapter 20, a communications adapter 22, a communications network 24, a user interface adapter 26, a keyboard 28, a mouse 30, a display adapter 32, and a computer monitor 34. It is to be understood and appreciated by those skilled in the relevant art that there are many possible configurations and arrangements of the components of the computer system 10 and that some components which may be typically included in the computer system 10 are not shown. Thus, the computer system 10 illustrated in FIG. 1 is for exemplarily purposes only and is not to unduly limit the spirit and scope of embodiments of the present invention.

Computer memory 16 may be any suitable memory storage device, including random access memory (RAM), cache memory, magnetic medium such as a resident hard disk, or other memory storage devices. The term "storage" may refer to computer resources, such as the computer memory 16, and may be employed to store suitable data or instructions in executing a computer program. For exemplarily purposes only and as best illustrated in FIG. 1, computer memory 16 may include at least one module 36, an operating system (O.S.) 38, a compilation system 40 including a compiler optimizer 60 having an instruction scheduler 50, a file system 42, and an emulator 44.

The compilation system 40 for various embodiments of the invention would comprise a compiler having a special program that processes statements written in a particular programming language and turns them into machine language or "code" that a processor, such as processor 14, uses. Typically, a programmer writes language statements in a language such as "Pascal" or "C" one line at a time using an editor. The file that is created contains what are called "source statements" or "source codes". The programmer then runs the appropriate language compiler, specifying the name of the file that contains the source statements. When the compiler executes or runs, the compiler first parses (or analyzes) all of the language statements syntactically one after the other and then, in one or more successive stages or "passes", builds the output code, making sure that statements that refer to other statements are referred to correctly in the final code. Traditionally, the output of the compilation has been called object code or sometimes an object module. It is well known that the object code is machine code that the processor of the computer can process or "execute" one instruction at a time. Thus, stated alternatively, the compiler translates source code into object code, particularly by looking at the entire piece of source code and collecting and reorganizing the instructions. Compilers have schedulers, such as instruction scheduler 50, for instruction scheduling. The scheduler is the compiler phase that orders instructions on a pipelined, superscalar, or VLIW architecture so as to maximize the number of function units operating in parallel and to minimize the time they spend waiting for each other. Examples of instruction scheduling that is performed by schedulers include, but are not limited to: filling a delay slot, interspersing floating-point instructions with integer instructions to keep both units operating, making adjacent instruction independent (e.g., one which writes a register and another which reads from it), and separating memory writes to avoid filling the write buffer.

Continuing to refer to FIG. 1 the processor 14 typically operates in cooperation with suitable software programs, including the computer memory 16, more particularly including the compilation system 40 and its associated compiler optimizer 60 and instruction scheduler 50, the O.S. 38 and the module 36. Henceforth, the fact of such cooperation among the processor 14 and these components of the computer memory 16, whether implemented in software, hardware, firmware, or any combination thereof, may therefore not be repeated or further described, but will be implied for purposes of various embodiments of the present invention. It is well known that a module, such as the module 36, typically operates in cooperation with the emulator 44 and the compilation system 40, but is not limited to such operation. By way of example only, the module 36 may operate in cooperation with the O.S. 38, which may in itself cooperate with the compilation system 40. The O.S. 38 may also cooperate with the file system 42 that manages the storage and access to files within the computer system 10.

The module 36 may be implemented in any suitable program language, or in any combination of software, hardware, or firmware. Thus, the module 36 may include instructions and data and be embodied in a computer-readable medium for use by or in connection with an instruction execution system, apparatus, or device, such as the computer system 10 which may pursue and derive any suitable instructions for operation. Any function ascribed to the module 36 and any of its associated functional files, whether implemented in software, hardware, firmware, or any combination thereof, may be included in the functions of the O.S. 38, since the O.S. 38 may include files from the module 36. In some instances, the functions ascribed to the module 36 may be typically performed by the processor 14 executing suitable software instructions in cooperation with aspects of the O.S. 38 that may incorporate the module 36. Therefore, it is to be understood that the module 36 may cooperate with aspects of the O.S. 38.

It will be appreciated by those skilled in the relevant art that the term "execute" may mean the process of manipulating code, such as software, for operation on the computer system 10. It will be further appreciated by those skilled in the relevant art that the term "code" may refer to any suitable instructions or data used by the computer system 10 for the purpose of generating instructions that can execute in the computer system 10. As indicated, the term "module" may refer to a software "procedure" or "function" such as a unit of code that may be independently compiled. Thus, a "computer program" may contain not only suitable software program code, but may also contain at least one module 36, and may be independently compiled and executed.

The emulator 44, as well as the compilation system 40 and the O.S. 38, may reside in the computer system 10, more particularly in the computer memory 16 of the computer system 10. The emulator 44 may substitute instructions typically associated with a different computer system than the executing computer system 10, for any original instruction. Any substitute instruction may be associated with a hardware, software, or firmware representation of a different computer system 10.

The data storage device 18 may be any suitable storage device, including a compact disk drive, a tape drive, a removable hard disk drive, or diskette drive. The data storage device 18 may communicate with the I/O adapter 20, which in turn communicates with other components of the computer system 10, in order to retrieve and store data used by the computer system 10. The data storage device 18 typically includes a computer storage medium having stored therein a computer software program and data.

The computer system 10 for embodiments of the present invention includes suitable input/output devices for accepting input information and promulgating generated information. Input/output devices may include any suitable storage device, such as a compact disk drive, a tape drive, a removable hard disk drive, or a diskette drive. Suitable input devices include, by way of example only, the keyboard 28, the mouse 30, a touch-screen display (not shown), a touch pad (not shown), a microphone including a voice recognition device (not shown), a network card (not shown), or a modem (not shown). The input devices may communicate with the user interface adapter 26 which in turn communicates with components in the computer system 10 for processing input and output commands. Program code may typically be loaded (via loader 82) through a suitable input device and may be stored on the data storage device 18. A copy of the program code, or any portion thereof, may alternatively be disposed by the processor 14 in the computer memory 16 for subsequent execution on the computer system 10.

Output devices may include any suitable output devices for presenting generated information to a user, whether a human or a machine, and whether local or remote. Such devices may include, by way of example only, the computer monitor 34, a printer (not shown), an audio speaker with a voice synthesis device (not shown), a network card (not shown), or a modem (not shown). Output devices, such as the monitor 34, may communicate with other components in the computer system 10 through the display adapter 32.

The computer system 10 for various embodiments of the present invention may communicate with communications network 24 via the communications adapter 22, such as a networking card. It may be appreciated that the communications network 24 may be a local area network, a wide area network, or any other suitable computer network. It may also be appreciated any suitable input/output device employed by the module 36 may be coupled to the communications network 24 through the communications adapter 22 and therefore may not necessarily be co-located with the computer system 10. Similarly other portions of the computer system 10, such as the data storage device 18 and the monitor 34, may be coupled to the communications network 24 through the communications adapter 22 and may also not be necessarily co-located with the computer system 10.

Figure 2:
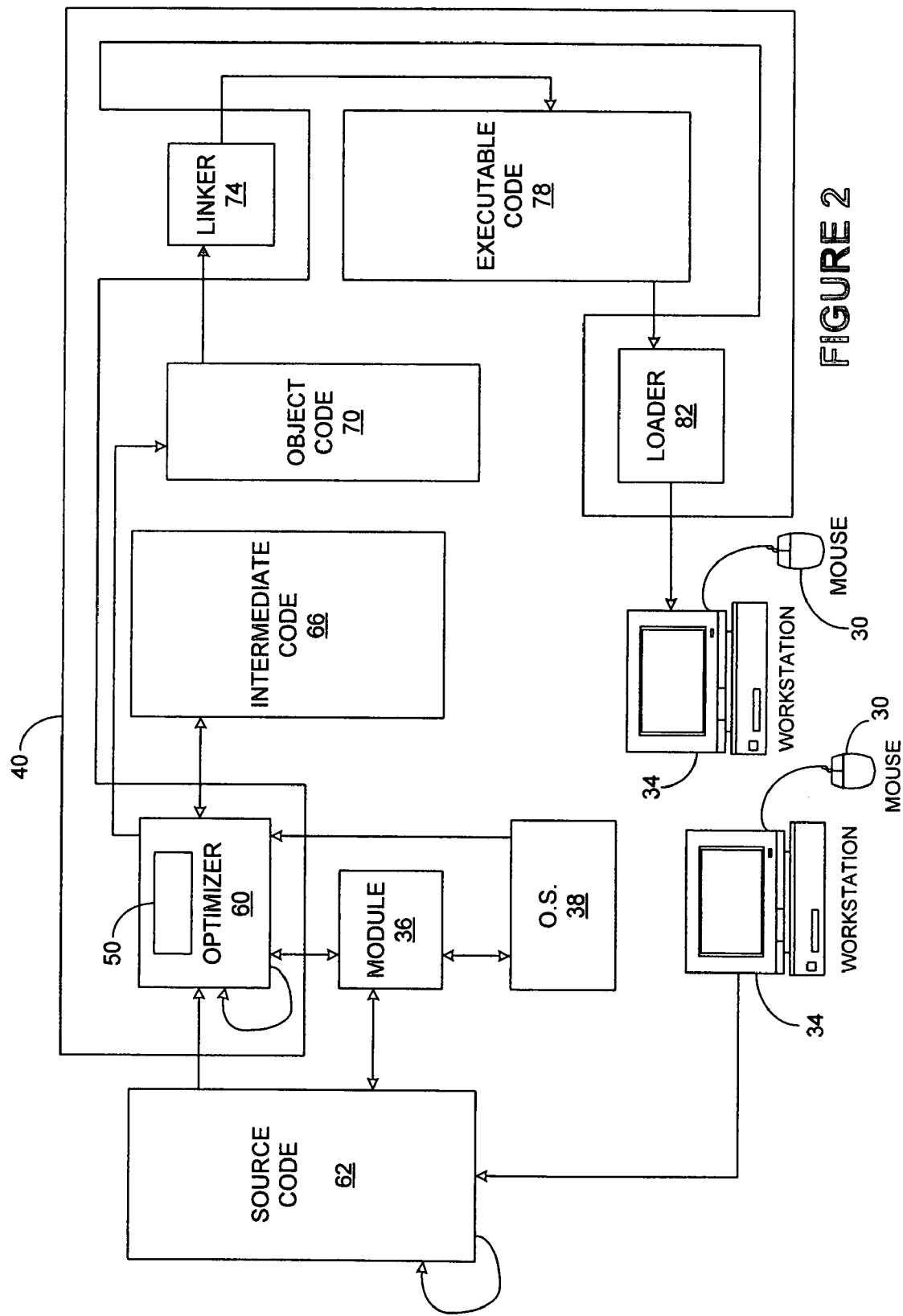
FIG. 2 is a schematic block diagram that exemplarily illustrates a compilation system for various embodiments of the present invention.
Figure 3:
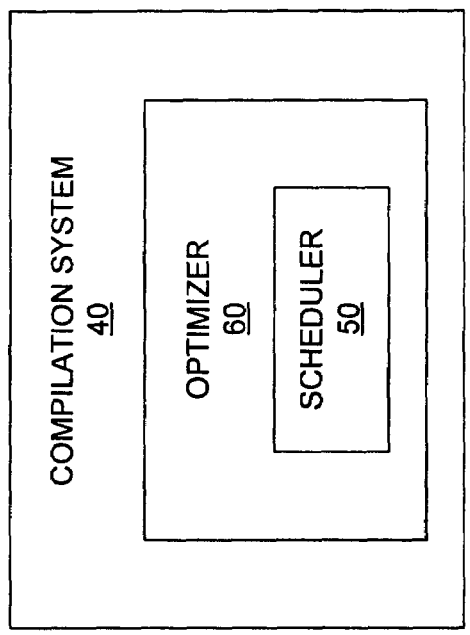
FIG. 3 is an enlarged schematic block diagram of a compilation system having a computer optimizer including an instruction scheduler.

Referring now to FIGS. 2 and 3, there is seen a schematic block diagram that exemplarily illustrates the compilation system 40 for various embodiments of the present invention. The compilation system 40 may operate in cooperation with module 36 and may employ software source code 62 that may be generated from the input/output devices (e.g., the keyboard 28 and the mouse 30) of the computer system 10. It is to be understood that various embodiments of the present invention may operate in cooperation with the O.S. 38, as well as the compilation system 40, and may operate on any multi-purpose computer system, such as computer system 10, and is not limited to any of the exemplary illustrations presented herein. The source code 62 may be created by any software developer, and would typically comprise a high-level programming language, such as "C". It is to be further understood that the source code 62 may be developed with a programming paradigm, such as an interface definition language (IDL) which typically defines an interface that is used with source code that complies with the IDL. After the source code 62 has been developed, it may be subsequently translated to a form of source code that may operate with the compilation system 40.

The computer system 10 may manage the processing of the source code 62 through the O.S. 38, which may direct the processing of the source code 62 through the compiler optimizer 60 that may generated intermediate code 66 from the source code 62. The intermediate code 66 typically is a list of intermediate-level instructions. Alternatively, the compiler optimizer 60 may generate object code 70 that includes appropriate optimization changes, which could be generated in accordance with various embodiments of the present invention, such as by way of example, the compiler optimizer features which comprise inter alia a system and method for eliminating branch instructions and/or creating and/or merging control flow paths of a computer program.

The computer optimizer 60, which may be a low-level optimizer, performs if-conversion steps. More specifically, the computer optimizer 60 for various embodiments of the present invention performs if-conversions in control flow paths of a computer program to determine when it is beneficial to eliminate branch instructions, such as those in a basic block, and merge control flow paths together using predication. In the compiler optimizer 60, if-conversion steps are performed immediately before instruction scheduling in the instruction scheduler 50.

For various embodiments of the present invention, the instruction scheduler 50 in the compiler optimizer 60 operates on regions (e.g., scheduling regions) in a computer program. For additional various embodiments of the present invention, the regions under compiler-optimizer operation in a computer program may be single entry, multiple exit subgraphs of a control-flow graph of a computer program. The instruction scheduler 50 may operate globally across a computer program and may move program instructions across one or more boundaries of basic blocks. For further additional various embodiments of the present invention, the scheduling phase ordering within the instruction scheduler 50 may be predicate materialization, dependence graph construction followed by appropriate branch elimination. The branch elimination process for embodiments of the present invention operates on control flow paths in a computer program, such as control flow paths within a scheduling region.

The output of the compiler optimizer 60 is preferably optimized object code 70 which may then be transmitted to a suitable linker 74 for resolving any undefined computer location references in the optimized object code 70 and for generating executable code 78 that is capable of executing on an output multi-purpose computer system, such as computer system 10, with appropriate input/output devices, such as the keyboard 28 and the mouse 30. It will be appreciated by those artisans skilled in the relevant art that the input of the computer system 10, and the output of the computer system 10, may both be the same, common computer system 10 and are not to be limited to the exemplary configuration disclosed and illustrated.

Figure 4A:
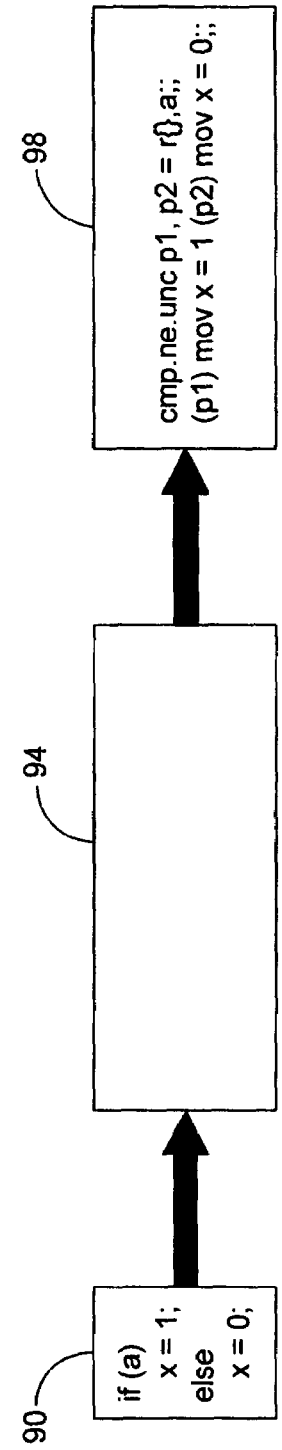
FIG. 4A is an exemplarily basic block flow diagram for illustrating, by way of example only, an execution for an embodiment of the present invention.
Figure 4B:
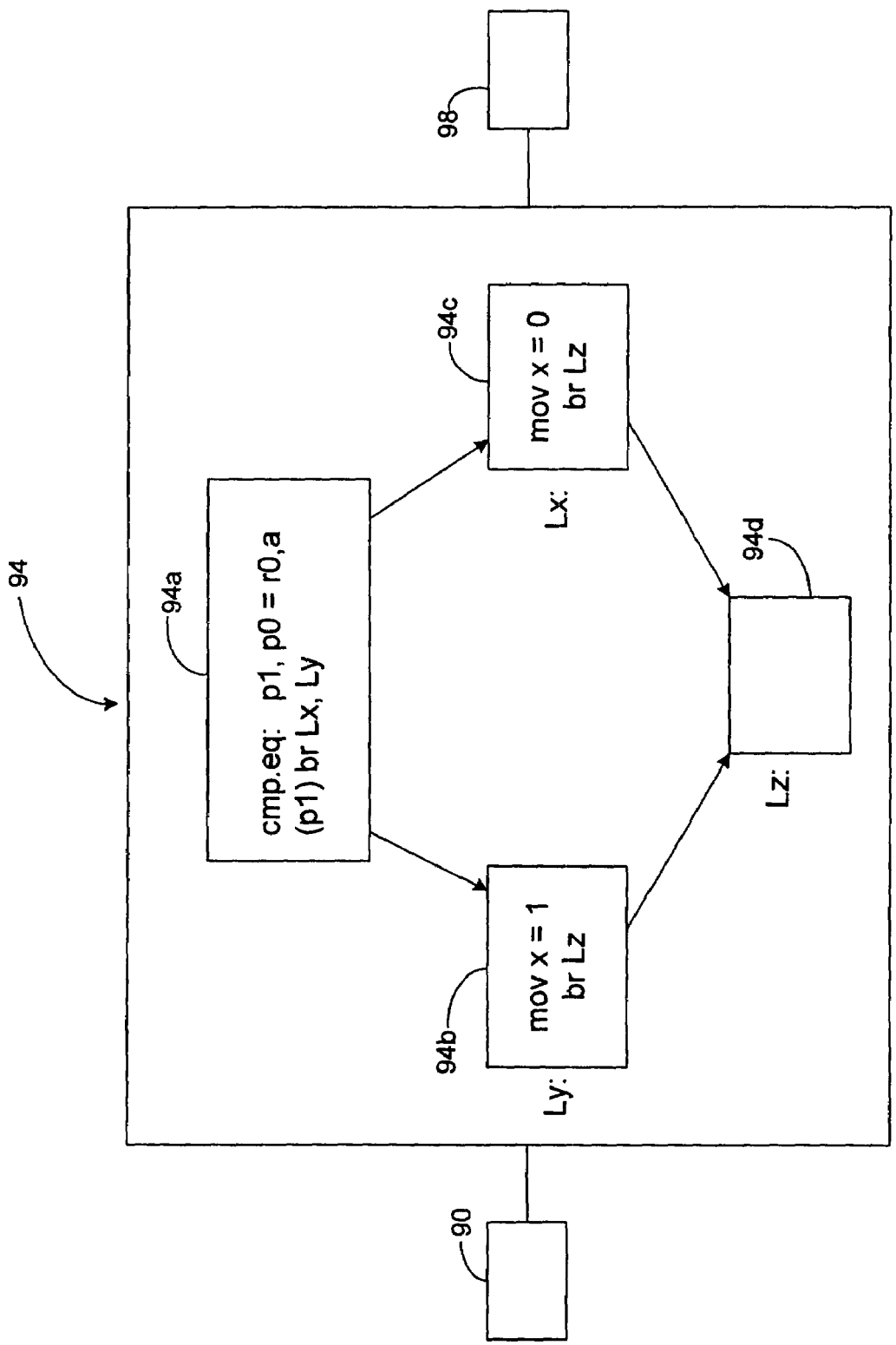
FIG. 4B is the exemplarily basic block flow diagram of FIG. 4A disclosing the execution steps of the intermediary block in FIG. 4A.

As previously mentioned, in the compilation system 40, which preferably includes the compiler optimizer 60 having the instruction scheduler 50, "if-conversions" in a computer program are preferably performed before any scheduling is conducted by the instruction scheduler 50. "If-conversion" preferably replaces control dependence on computer program branches with and/or data dependencies on predicates or prediction parameters. In FIGS. 4A and 4B there are seen schematic exemplarily block flow diagrams for an "if-conversion", representing a true or false test for setting a value for "x". More specifically, and as illustrated in block 90, if "(a)" is true, then set the value for "x" as one(1). If "(a)" is not true, then set the value for "x" as zero(0).

Block 94 as best shown in FIG. 4B contains the basic blocks of instructions required to implement the statements in block 90. Internal block 94a contains a compare instruction block that sets predicate "p1" to TRUE if "a" equal 0 and a branch instruction which jumps to Lx of internal box 94c if "p1" is TRUE and Ly of internal block 94b if "p1" is FALSE. Internal block 94b contains an instruction that sets "x" to 1 then branches to Lz of internal block 94d. Internal block 94c contains an instruction that sets "x" to 0 then a branch which jumps to Lz of internal block 94d.

Block 98 represents the code in block 94 after application of if-conversion. All branches have been eliminated. The instruction setting "x" to 1 is guarded by predicate "p1" which is true if "a" is not equal to 0. The instruction setting "x" to 0 is guarded by predicate "p2" which is true if "a" is equal to 0.

The desire is to eliminate potentially difficult to predict computer program branches by merging certain control flow paths, or at least subsets thereof. The benefit of merging selected control flow paths is to avoid computer program branch misprediction penalties. A misprediction penalty is the cost of mispredicting the direction of a branch instruction. More specifically, a misprediction penalty is typically the number of processor cycles required for the CPU to detect the misprediction and commence executing instructions along the correct control flow path.

Thus, the computer system 10, preferably the compilation system 40 including the compiler optimizer 50, performs "if-conversions" before the instruction scheduler 50 performs instructional scheduling. More specifically, the computer system 10 including the associated compiler optimizer 50 performs appropriate "if-conversions" when it is beneficial to eliminate certain computer program branches and merge control flow paths, or at least subsets thereof, before any instruction scheduling and phase ordering takes place within the instruction scheduler 60. It has been discovered that it is beneficial to merge together control flow paths, or at least subsets thereof, including basic blocks associated with the control flow paths, when the cost of a computer program branch of a control flow path (i.e., the control flow path which potentially is to be eliminated) is greater than the cost of increasing the number of instructions (e.g., increasing the size of a basic block, or augmenting instructions of a basic block with additional instructions from or merging with another basic block) in the control flow path which is not to be eliminated and is the receptive control flow path (i.e., the critical control flow path) in the merger of the control flow paths. Stated alternatively, it has been discovered that it is beneficial to merge control flow paths, or at least subsets thereof, including the associated basic blocks, when the computer program branch cost in a particular flow control path (i.e., the control flow path that is a candidate for elimination) is greater than the cost of a height increase of a merged or combined basic block (i.e., a basic block which has been at least partially combined with another (eliminated) basic block) in a non-eliminated control flow path.

A "basic block" for purposes of various embodiments of the present invention may be a sequence of statements or instructions in a computer program, well known to those skilled in the art, especially in the art of computer compilers. More specifically, a "basic block" may be a sequence of consecutive statements or instructions in which flow of control enters at the beginning and leaves at the end without terminating, or possibly branching, except at the end. A basic block includes a "branch instruction" for determining the next basic block to be executed. Also for purposes of embodiments of the present invention, "cost" may be defined as the number of CPU or processor cycles required to execute a computer instruction or group of computer instructions. The cost of a computer program branch depends on the frequency of execution of the computer program branch, the ability of the microprocessor to predict the computer program branch target correctly, and the penalties associated with incorrect (or even correct) mispredictions.

Processors have the ability to predict a computer program branch target correctly through the employment of hardware mechanisms that predict the direction a computer program branch will take. Such processor hardware mechanisms will also mispredict the direction of a computer program branch at a given rate that is dependent on both the particular hardware mechanism employed and the behavior of the particular computer program branch. Penalties associated with incorrect mispredictions include the number of CPU cycles required to detect the misprediction and begin executing instruction(s) on the correct path. Penalties associated with correct predictions include the number of cycles required to begin executing instructions at the target of a correctly predicted taken computer program branch.

The cost of a computer program branch may be determined by the following source code:

$$BranchCost(b)=(TR(b)\times(1-MPR(b)\times CPTBP(m))+(MPR(b)\times MPP(m))$$

where: $TR(b)$ is the used or taken ratio (predictive ratio) of Branch(b);

$MPR(b)$ is the mispredict ratio of Branch(b);

$CPTBP(m)$ is the correctly predicted taken branch penalty in cycles for a microprocessor m; and $MPP(m)$ is the mispredict penalty in cycles for microprocessor m.

For various embodiments of the present invention, it has been empirically determined that:

$$MPR(b)=-1.04357\times TR(b)^2+1.1987\times TR(b)+0.0112$$

As will be further explained hereafter, it has been discovered that if the cost in cycles of a computer program branch is greater than the increase in resource height, or the increase in dependence height, then it is beneficial to combine control flow paths. Thus, if the computer program branch cost in cycles minus(−) the increase in the number of cycles due to the resource height increase, or the dependence height increase, is greater than zero(0), then it is beneficial to merge that computer program branch with another computer program branch. For various embodiments of the present invention, a comparison is made between the resource height increase and the dependence height increase to determine which of the two is the largest. After this determination has been made, then the larger of the two is used to determine if it is beneficial to merge control flow paths. Therefore, if the cost in cycles of a computer program branch is greater than the largest of, or the largest between, the resource height increase and dependence height increase for that computer program branch merged with another computer program branch, then it would be beneficial to merge that computer program branch with the other computer program branch. Stated alternatively, the final benefit would essentially be the cost of all branches eliminated by merging control flow paths (e.g., two control flow paths) minus or less the largest of the increase in dependence height and the increase in resource height, as the result of merging the control flow paths (e.g., the result of merging the two control flow paths).

The term "height" may include "resource height" and/or "dependence height". The resource height for a control flow path is the number of cycles that a computer system takes to execute the instructions in each basic block on a control flow path. "Resource height" ignores dependencies amongst and/or within a given set of instructions of basic block(s). Thus, no instruction in a basic block depends on a value or parameter produced from or by another instruction in the basic block or in any other basic block. Stated alternatively, for a "resource height" all instructions are mutually exclusive in the sense that one or more instructions do not depend on one or more other instructions.

"Dependence height" for a control flow path also depends on the number of cycles that a computer system takes to execute instructions in each basic block on a control flow path. However, "dependence height" does have dependency among and/or within a given set of instructions of basic block(s), yet ignores the resources required to execute the instructions. Stated alternatively, "dependence height" takes into account any latency among instructions of a basic block or instructions from another basic block. In other words, for a "dependence height" a value or parameter produced by one or more instructions in a basic block is employed by one of more other instructions in the basic block or in another basic block. Thus, instructions in a basic block for "dependence height" are not mutually exclusive of each other, yet require no resources to execute.

When a combined "resource height" and/or "dependence height" for two or more control flow paths is to be determined, the "resource height" and/or "dependence height" is respectively weighted in accordance with a probability factor that the computer system will be instructed to execute one particular control flow path as opposed to one or more other control flow paths. Stated alternatively, when a combined resource height and/or combined dependence height is to be determined for two or more control flow paths, the number of cycles for a "resource height" and/or the number of cycles for a "dependence height" of the respective two or more control flow path is multiplied by a respective probability factor associated with the control flow paths. A probability factor (identified above as and defined below as "predicted ratio") for a control flow path is the probability or likelihood that a computer system will be instructed to execute the instructions of that control flow path. These probability-factor executions produce a "weighted" number of cycles (i.e., a weighted resource height and/or a weighted dependence height) for each control flow path. As will be further explained below, the weighted resource height and/or weighted dependence height for each control flow path is then added together to obtain respectively a combined resource height and/or a combined dependence height for the control flow paths.

A cycle may be defined as a unit of real time that depends on the speed of the CPU clock. A "pass" is a single cycle in the processing of a set of data, usually performing part of an overall process. For example, a pass of an assembler through a source program or a pass of a sort program through a set of data. As indicated above, the term "predicted ratio" means or may be defined as the probability factor or likelihood that the computer system will be instructed to execute certain one or more instruction(s) (e.g., basic block(s)) in a control flow path, or any subset thereof, as opposed to being instructed to execute one or more instruction(s) in another control flow path. "Predicted ratio" is empirically determined from past observations and/or experiences, and is employed when a "resource height" and/or a "dependence height" is or are to be weighted in order to determine the "weighted resource height" and/or "weighted dependence height" for control flow paths, both in a merged status and/or in an unmerged status. A "mispredict ratio" is the ratio of the number of times a computer program branch is mispredicted over the number of times the computer program branch is executed.

Figure 5:
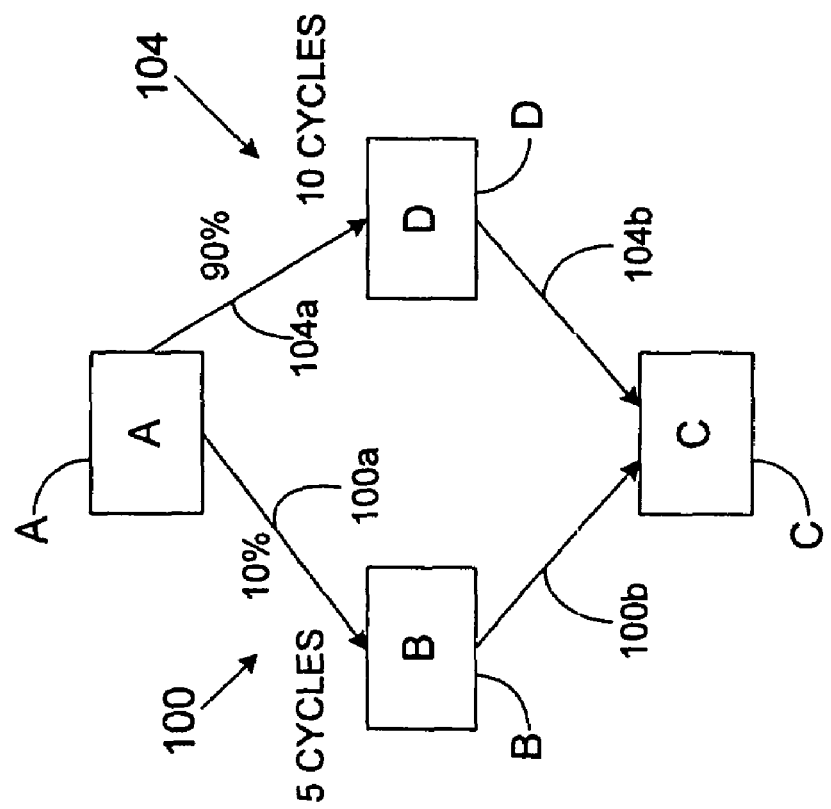
FIG. 5 is a basic block assembly for illustrating embodiments of the present invention.

Referencing now FIG. 5 for providing further explanation with respect to "resource height" and "weighted resource height", there is seen in FIG. 5 basic blocks A, B, C, and D. Basic blocks A and B and C provide a control flow path 100 having subset control flow paths 100a and 100b. Basic block D provides a control flow path 104 having subset control flow paths 104a and 104b. Assuming empirically derived information (e.g., information derived from observation or experiment or experience) shows a 10% probability that subset control flow path 100a (including basic block B) will be chosen or taken based on instructions produced by basic block A, a 90% probability would then result that control flow path 104 (including basic block D) will be chosen or taken. Also assume that subset control flow path 100a (including basic block B) and control flow path 104 (including basic block D) respectively take 5 cycles and 10 cycles for execution. The resource height for subset control flow path 100a (including basic block B) would be 5 cycles, and the resource height for control flow path 104 (including basic block D) would be 10 cycles. The total weighted resource height for subset control flow path 100a and control flow path 104 in an unmerged, separate state would be 0.50 cycles (i.e., (0.10)(5 cycles)) plus 9.0 cycles (i.e., (0.90)(10 cycles)), or 9.5 cycles.

Figure 6:
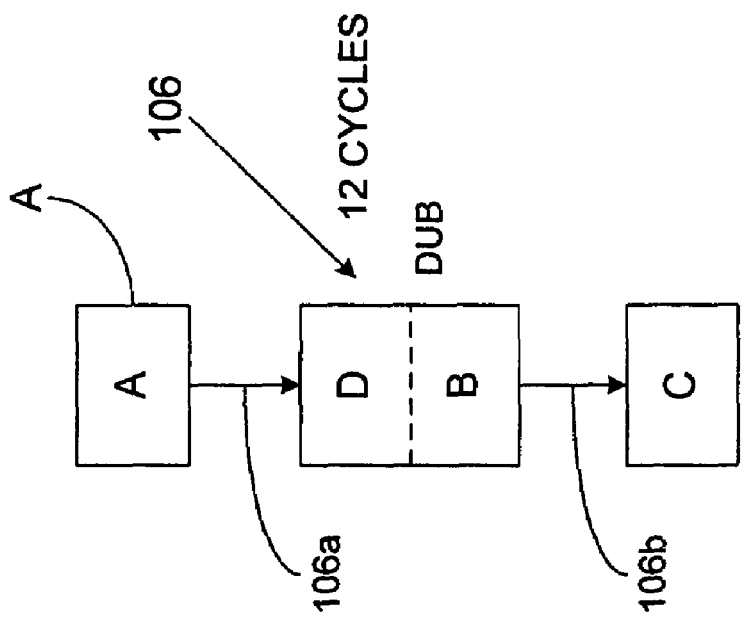
FIG. 6 is a merged basic block assembly of the basic block assembly of FIG. 5 for illustrating embodiments of the present invention.

To determine the total or combined resource height for when subset control flow path 100a and control flow path 104 are merged, reference is now made to FIG. 6 where there is seen basic block A, merged/combined basic block D-B, and basic block C, all forming merged control flow path 106 having subset control flow paths 106a and 106b. Assuming from an empirical determination that merged control flow path 106 takes 12 cycles for execution, the total weighted resource height for control flow path 104 and subset control flow path 100a when merged would equal 90%(12 cycles) plus 10%(12 cycles), or 10.8 cycles plus 1.2 cycles, or 12 cycles. When subset control flow path 100a (including basic block B) merges with control flow path 104 (including basic block D), merged/combined basic block D-B is produced along with associated subset control flow paths 106a and 106b, thus causing the elimination of subset control flow paths 100a and 10b, along with subset control flow paths 104a and 104b of control flow path 104.

Furthermore, the increase in resource height would be 12 cycles minus(−) 9.5 cycles, or 2.5 cycles. Stated alternatively, the increase in resource height, or incremental change in resource height, as a result of merging control flow paths, such as subset control flow path 100a and control flow path 104, would be the weighted resource height of the merged control flow paths (e.g., merged control flow path 106 merged basic block D-B) minus or less the additive/combined weighted resource heights of the respective control flow paths not merged or in singular status (e.g., the weighted resource height of subset control flow path 100a including its associated basic block B plus the weighted resource height of control flow path 104 including its associated basic block D).

Figure 7:
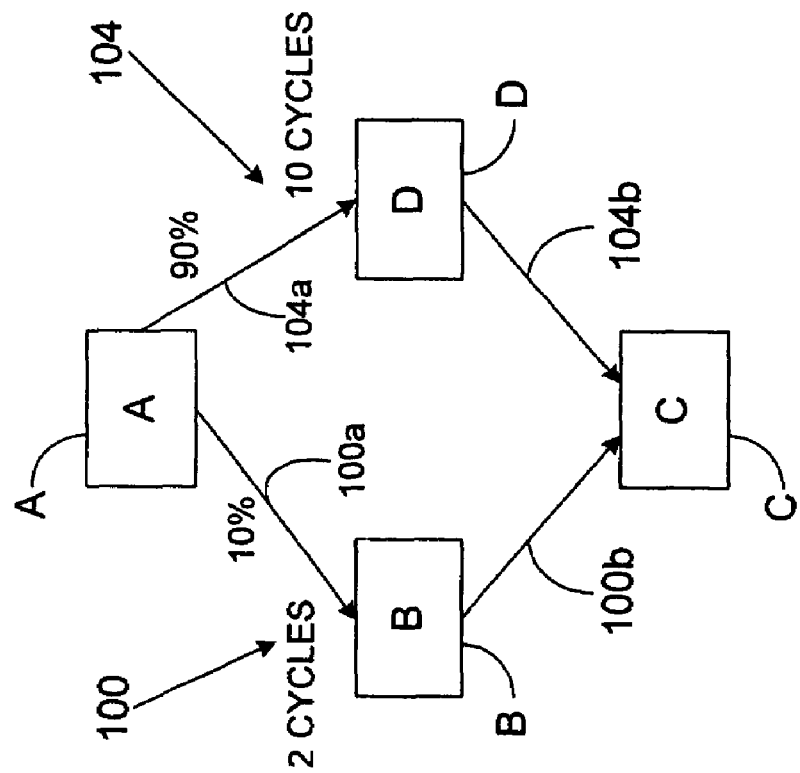
FIG. 7 is a basic block assembly for illustrating another embodiment of the present invention.

Reference now is made to FIG. 7 for providing further explanation with respect to "dependence height" and "weighted dependence height", there is seen in FIG. 7 the basic blocks A, B, C, and D. As previously indicated, basic blocks A and B and C provide the control flow path 100 having subset control flow paths 100a and 10b, and basic block D provides the control flow path 104 having subset control flow paths 104a and 104b. As previously assumed for the "resource height" example illustrated in FIGS. 5 and 6, it is again assumed that empirically derived information (e.g., information derived from observation or experiment or experience) shows a 10% probability that subset control flow path 100a (including basic block B) will be chosen or taken based on instructions produced by basic block A, leaving a 90% probability for control flow path 104 (including basic block D) being chosen or taken. For the dependence height illustration in FIG. 7, it is assumed that subset control flow path 100a (including basic block B) and control flow path 104 (including basic block D) respectively take 2 cycles and 10 cycles for execution. The dependence height for subset control flow path 100a (including basic block B) would be 2 cycles, and the dependence height for control flow path 104 (including basic block D) would be 10 cycles. The total weighted dependence height for subset control flow path 100a and control flow path 104 in an unmerged, separate state would be 0.20 cycles (i.e., (0.10)(2 cycles)) plus 9.0 cycles (i.e., (0.90)(10 cycles)), or 9.2 cycles.

Figure 8:
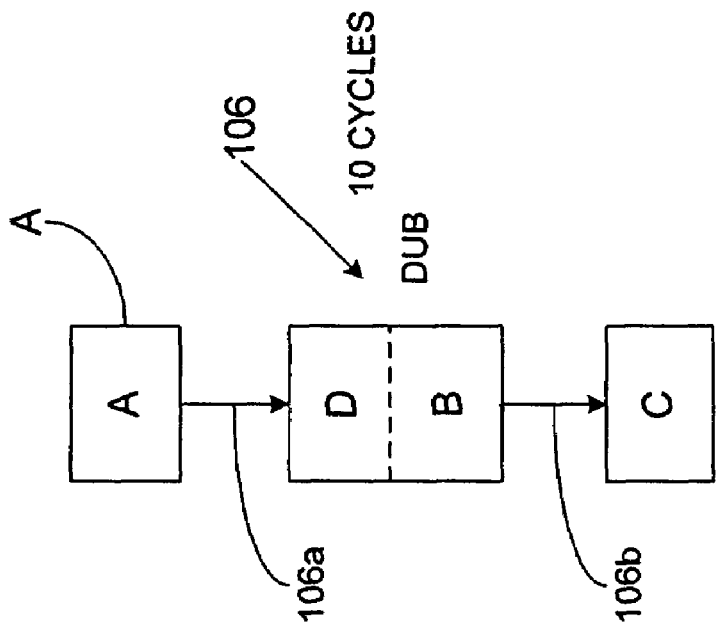
FIG. 8 is a merged basic block assembly of the basic block assembly of FIG. 7 for illustrating embodiments of the present invention.

To determine the total or combined dependence height for when subset control flow path 100a and control flow path 104 are merged, reference is now made to FIG. 8 where there is seen basic block A, merged/combined basic block D-B, and basic block C, all forming the merged control flow path 106 having subset control flow paths 106a and 106b. As previously assumed for the "resource height" example illustrated in FIGS. 5 and 6, it is again assumed that empirically derived information indicates that the merged control flow path 106 takes 10 cycles for execution. The total weighted dependence height for control flow path 104 and subset control flow path 100a when merged would equal 90%(10 cycles) plus 10%(10 cycles), or 9.0 cycles plus 1.0 cycles, or 10 cycles. Furthermore, the increase in dependence height would be 10 cycles minus(−) 9.2 cycles, or 0.8 cycles. Stated alternatively, the increase in dependence height, or incremental change in dependence height, as a result of merging control flow paths, such as subset control flow path 100a and control flow path 104, would be the weighted dependence height of the merged control flow paths (e.g., merged control flow path 106 merged basic block D-B) minus or less the additive/combined weight dependence heights of the respective control flow paths not merged or in singular status (e.g., the weighted dependence height of subset control flow path 100a including its associated basic block B plus the weighted dependence height of control flow path 104 including its associated basic block D). As was seen for the illustration of FIGS. 5 and 6, when subset control flow path 100a (including basic block B) merges or is combined with control flow path 104 (including basic block D), the merged/combined basic block D-B is produced along with its associated subset control flow paths 106a and 106b. The merger or combination eliminates subset control flow paths 100a and 100b and subset control flow paths 104a and 104b of control flow path 100 and control flow path 104, respectively.

For determining the cost of executing the branch instructions in control flow path 100, as previously indicated, the following source code is employed:

BranchCost(b)=(TR(b)×(1−MPR(b)×CPTBP(m))+
(MPR(b)×MPP(m))

where: TR(b) is the used or taken ratio (predictive ratio) of Branch(b);
MPR(b) is the mispredict ratio of Branch(b);
CPTBP(m) is the correctly predicted taken branch penalty in cycles for a microprocessor m; and
MPP(m) is the mispredict penalty in cycles for microprocessor m.

For the subset control flow path 100a (including basic block B) of the control flow path 100 in FIG. 5, and where "b" represents the computer program branch which terminates basic block A, or is the source of subset control flow path 100a, TR(b) would equal 0.10, MPR(b) would equal 0.90, CPTBP(m) would equal 5 cycles, and MPP(m) would equal 10 cycles. The computer program branch cost in cycles then for executing branch "b" would then be equal to (0.10×((1−0.90)×5 cycles)+(0.90×9 cycles), or 0.05 cycles+8.1 cycles, or 8.15 cycles.

For one embodiment of the invention, the computer program branch cost and the resource height increase are used to determine if it is beneficial to merge control flow paths. If the computer program branch cost is greater than the resource height increase, then there is benefit in the merger. Thus, for the example pertaining to the illustration of FIGS. 5 and 6, the resource height increase of 2.5 cycles is used in combination with the computer program branch cost of 8.15 cycles for subset control flow path 100a (including basic block B) to determine if it is beneficial to merge subset control flow path 100a with control flow path 104 (including basic block D). More particularly, since the computer program branch cost of 8.15 cycles is greater than the resource height increase of 2.5 cycles, it would then be beneficial to combine subset control flow path 100a with control flow path 104 to obtain the control flow path 106 (including combined instructions or merged basic block D-B). The final or total benefit of this merger would be the cost of eliminating subset control flow path 100a (i.e., 8.15 cycles) minus(−) the resource height increase (i.e., 2.5 cycles), or 5.65 cycles.

In a further embodiment of the present invention, the computer program branch cost and the dependence height increase are used to determine if it is beneficial to merge control flow paths. For this embodiment, if the computer program branch cost is greater than the dependence height increase, then there is benefit in a merger. Thus, for the example pertaining to the illustration of FIGS. 7 and 8, the dependence height increase of 0.8 cycles is used in combination with the computer program branch cost of 8.15 cycles for subset control flow path 100a (including basic block B) to determine if it is beneficial to merge subset control flow path 100a (including basic block B) with control flow path 104 (including basic block D). More particularly, since the computer program branch cost of 8.15 cycles is greater than the dependence height increase of 0.8cycles, it would then be beneficial to combine subset control flow path 100a (including basic block B) with control flow path 104 (including basic block D) to obtain the control flow path 106 (including combined branch instructions or merged basic block D-B). The final or total benefit of this merger would be the cost of eliminating subset control flow path 100a (i.e., 8.15 cycles) minus(−) the dependence height increase (i.e., 0.8 cycles), or 7.35 cycles.

In another embodiment of the present invention, a comparison is made between the increase in resource height and the increase in dependence height. More specifically, to determine the final benefit of merging control flow paths, the computer branch cost in cycles is used in combination with the largest cycle value between the resource height increase or the dependence height increase is selected. Thus, if the cycle value of the resource height increase is larger than the cycle value of the dependence height increase, the cycle value for the resource height increase is selected for determining the final benefit of merging control flow paths. If the cycle value of the dependence height increase is larger than the cycle value of the resource height increase, the cycle value for the dependence height increase is selected for determining the final benefit of merging control flow paths. For the resource height example of FIGS. 5–6 and the dependence height example of FIGS. 7–8, the dependence height increase of 0.8 cycles is less than the resource height increase of 2.5 cycles. Thus, 2.5 cycles is selected for determining the final benefit of merging control flow paths. The final or total benefit of the merger for this embodiment of the present invention would be the cost of eliminating subset control flow path 100a (i.e., 8.15 cycles) minus(−) the resource height increase (i.e., 2.5 cycles), or 5.65 cycles.

Figure 9:
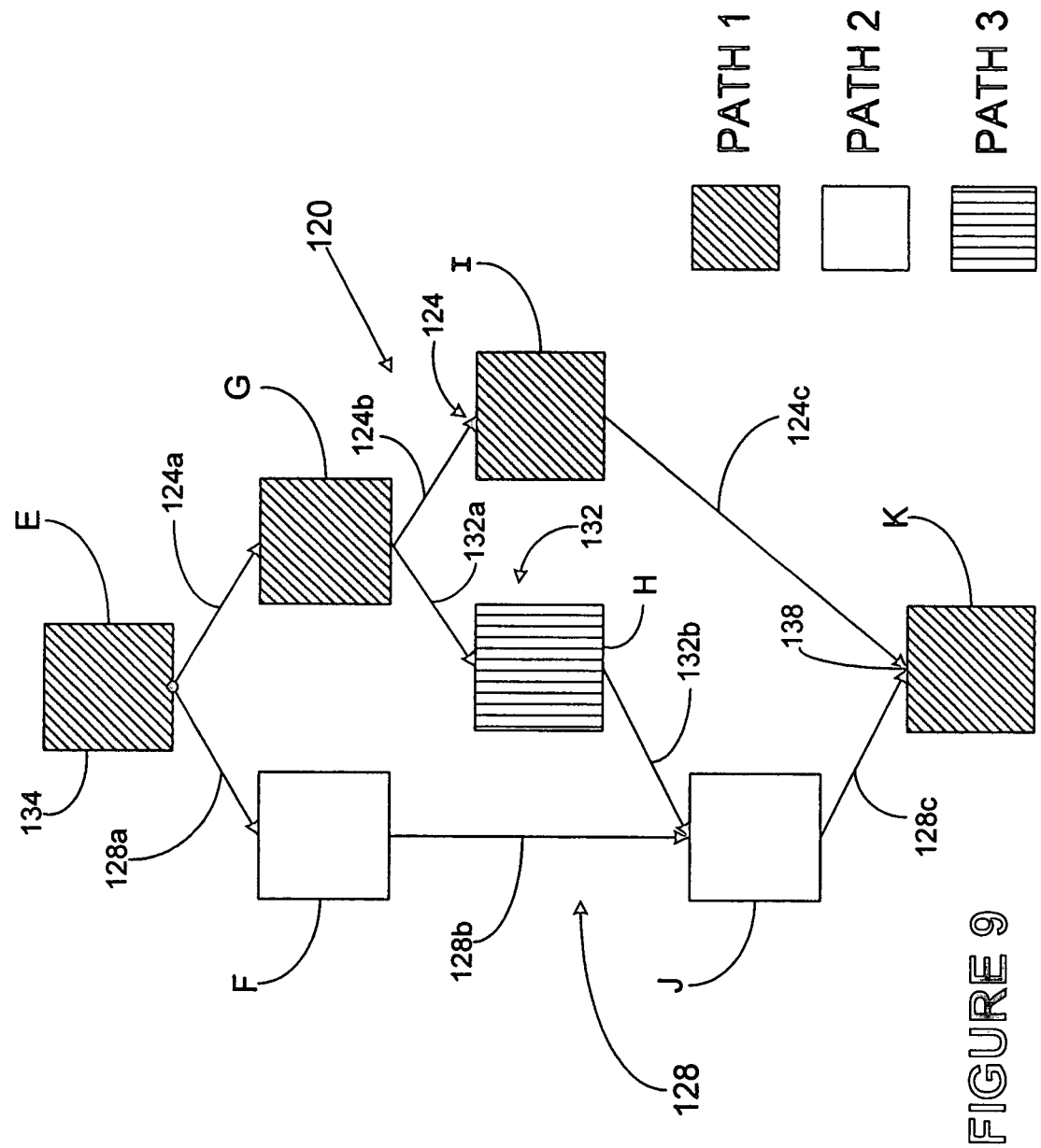
FIG. 9 is another basic block assembly for illustrating embodiments of the present invention.

Referring now to FIG. 9 by way of providing and illustrating further embodiments of the present invention, there is seen an assembly of computer control branches including control flow paths, generally illustrated as 120. In one embodiment of the present invention, the assembly of control flow paths 120 comprises a scheduling region of a computer program and includes basic blocks E, F, G, H, I, J and K, representing three(3) control flow paths, more specifically, control flow paths 124, 128, and 132, respectively including subset control flow paths 124a, 124b, 124c, and subset control flow paths 128a, 128b, 128c, and subset control flow paths 132a and 132b. Basic block E may, by way of illustration only, represent an entry basic block having branch instruction 134, and basic block K, by way of further illustration only, may represent an exit basic block. It is to be recalled that all basic blocks typically have a branch instruction. It is to be noted that any regions of any computer program may have a plurality of exit basic blocks, such as basic block K. Control flow path 128 includes basic blocks F and J. Control flow path 124 comprises entry basic block E, basic blocks G and I, and exit block K. Control flow path 132 extends from basic block G to basic block J and includes the branch instruction of basic block H and associated subset control flow paths 132a and 132b.

Various embodiments of the present invention provide a method for assigning a basic block in a computer program to a control flow path. More specifically, and by way of illustration only, various embodiments of the present invention provide for a method of assigning each basic block in the assembly 120 of FIG. 9 to a control flow path.

Figure 10:
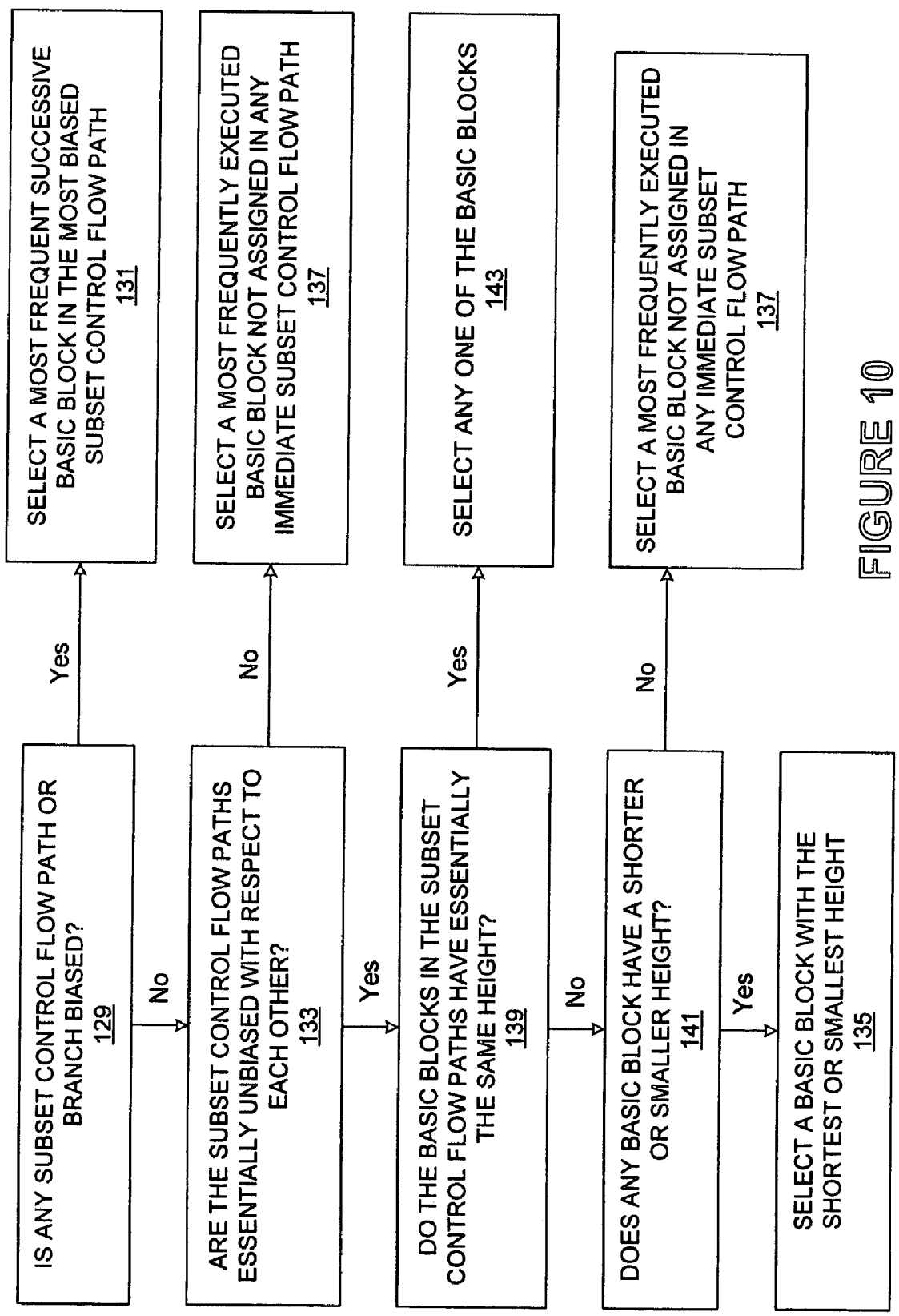
FIG. 10 is a schematic block flow diagram for other various embodiments of the present invention.

In one embodiment and also referencing the block flow diagram of FIG. 10, a basic block may be selected from the entry basic block E in FIG. 9 in accordance with an "if-instruction" (e.g., determining "if" conditions) selected from the group of "if-instructions" comprising:(i) if, as illustrated by decision block 129 in FIG. 10, immediate subsets (e.g., subset control flow paths 124a and 128a) of control flow paths (e.g., control flow paths 124 and 128) commencing with the entry basic block E are biased subsets (e.g., have predictive ratios differing by more than plus(+) or minus(−) 5%), select, as illustrated by decision block 131 in FIG. 10, a most frequent successive basic block in the most biased subset of the control flow paths; (ii) if immediate subsets of control flow paths commencing from the entry basic block E are essentially unbiased subsets(as tested by decision block 133 in FIG. 10), particularly with respect to each other(e.g., have predictive ratios that do not differ by more than plus(+) or minus(−) 5%), select, as illustrated by decision block 135 in FIG. 10, a basic block with the shortest height (e.g., the shortest or smallest resource height or the shortest or smallest dependence height)after testing the heights of the basic blocks in accordance with decision blocks 139 and 141; (iii) if immediate subsets of control flow paths commencing from the entry basic block E are essentially unbiased subsets, and if the basic blocks have essentially the same height (e.g. the heights do not differ by more than plus(+) or minus(−) 5%), select, as illustrated by decision block 143 in FIG. 10, any one of the basic block in the immediate subsets of the control paths; and (iv) if immediate subsets of control flow paths commencing from the entry basic block E contain no basic block selected in accordance with the "if-instruction" of subparagraph (i) or the "if-instruction" of subparagraph (ii) or the "if-instruction" of subparagraph (iii), select, as instructed by decision blocks 137 in FIG. 10, a basic block (e.g., a frequently or a most frequently executed basic block) not assigned in any immediate subset of the control flow paths to commence a new control flow path.

The biasness of subset control flow paths 124a and 128a would be based on the respective predictive ratios associated with each of the subset control flow paths 124a and 128a. Thus, if subset control flow path 128a has a predictive ratio of 30%(0.30) and subset control flow path 124a has a predictive ratio of 70%(0.70), the most biased subset control flow path would be subset control flow path 124a, and basic block G would be chosen and assigned to the control flow path containing basic block E since it is the most frequent successive basic block in the most biased subset flow control path. If the immediate subset control flow paths 124a and 128a are essentially unbiased with respect to each other, that is they have predictive ratios which are essentially equal (e.g., predictive ratios that do not differ by more than plus(+) or minus(−) 5%(0.05), then the basic block with the smallest or shortest resource height or dependence height is chosen. If basic block G has a shorter or smaller resource height in cycles than basic block F, then basic block G would be chosen, and vice versa. If basic block F has a shorter or smaller dependence height in cycles than basic block G, then basic block F would be chosen, and vice versa. If one basic block has a shorter or smaller resource height and the other basic block has a shorter or smaller dependence height, then the basic block (e.g., basic block G) with the shortest or smallest resource height would be selected. The control flow path would then be extended by applying the "if-instructions" of subparagraphs (i), (ii), and (iii) supra to the newly selected basic block.

Figure 11:
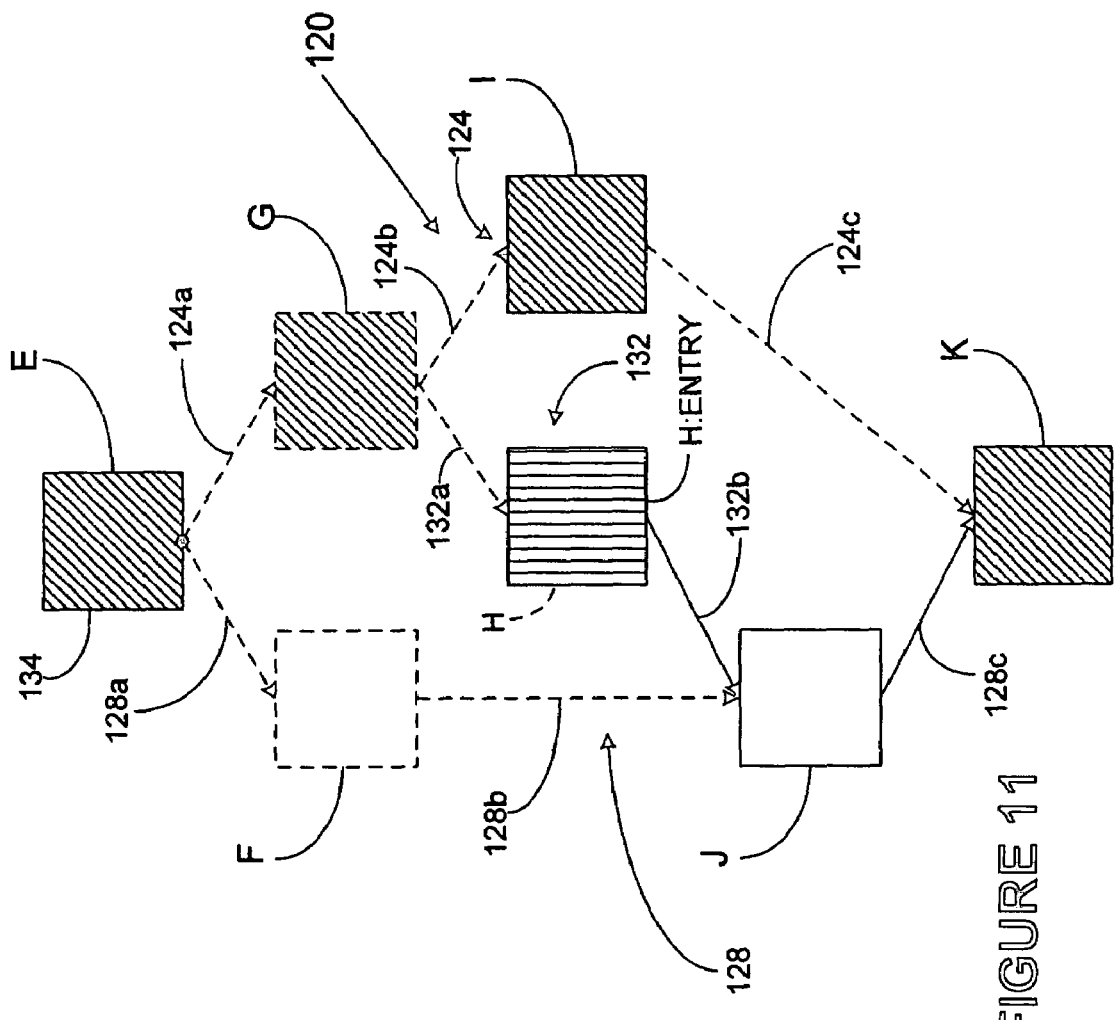
FIG. 11 is yet another basic block assembly for illustrating embodiments of the present invention.

As previously mentioned and under the "if-instruction" of subparagraph (iv) supra, if immediate subsets of control flow paths commencing with the entry basic block E contain no basic block(s) selected in accordance with the "if-instruction" of subparagraph (i) or the "if-instruction" of subparagraph (ii) or the "if instruction" of subparagraph (iii), then a (e.g., a frequently or a most frequently executed) basic block not assigned in any immediate subset control flow paths is selected to commence a new control flow path. Thus, if no viable basic-block successor from entry basic block E is found in accordance with the "if-instructions" of subparagraphs (i), (ii), and (iii), the basic block as indicated not yet on any subset control flow path (e.g., not on subset control flow paths 124a or 128a) is subsequently chosen. Reasons for not finding any available viable basic-block successor would include that there is no successor basic block in the region, or there is no successor basic block not yet assigned to a control flow path. Thus, by way of example only and now referencing FIG. 11, if basic block G or basic block F is not chosen to extend the control flow path commencing from basic block E under the "if-instructions" of subparagraphs (i), (ii), and (iii) supra, then basic block H could be chosen if basic block H is a basic block (e.g., a frequently or most frequently executed basic block) not assigned to any control flow path. This selection would commence a new computer control flow path with basic blocks H being the entry basic block H:ENTRY for the new control flow path. The process continues until there are no more basic blocks to be chosen.

It is to be understood basic blocks F, G, J or I could have been chosen instead of basic block H and concomitantly commencing a new computer control flow path, if either basic block F, G, J or I is more frequently executed than basic block H. Thus, other various embodiments of the present invention provide a method for commencing a computer control flow path in a computer program. For this embodiment of the present invention, the computer control flow path, or at least a subset control flow path, would be commenced or begun through the non-selection of a basic block (e.g., basic block G or basic block F) assigned on one of the immediate subset control flow paths (e.g., subset control flow paths 124a and 128a), and through the selection of a basic block (e.g. basic block H:ENTRY) not assigned in any immediate subset control flow paths.

Any control flow path or subset control flow path, including one or more basic blocks associated therewith, may be eliminated or merged with or into another control flow path, or subset control flow path, in accordance with the previously mentioned procedures and principles. It is desired not to necessarily eliminate all control flow paths saving one, but to eliminate the control flow paths and associated basic blocks for which the computer system 10 including the compilation system 40 estimates that the cost of executing the computer program branch instructions is higher than, or greater than, the cost of merging the control flow paths, more specifically two control flow paths. For each subset control flow path in the computer program, such as in the control flow path assembly 120 of FIG. 9, it is to be determined if there is another control flow path, or subset control flow path, that splits off from and/or rejoins a current control flow path. By way of example only, control flow path 128 in FIG. 9 is a candidate for merger with and/or into control flow path 124. The procedure continues until there are no more control flow paths which can be profitably combined in accordance with the previously set forth principles (e.g., such principles inter alia where it is determined that the final benefit for any merger is essentially the cost of all computer program branches eliminated by merging two control flow paths minus the largest of the increase in resource height and the increase in dependence height as the result of the merging of two control flow paths). The procedure takes into consideration whether or not it is possible to combine two control flow paths (these considerations are implementation dependent), and whether or not it is beneficial to combine two control flow paths. As previously indicated, it is beneficial to combine two control flow paths if the cost of the control flow path (and associated instructions) being eliminated is more than the increase in resource height and/or increase in dependence height of the merged path.

Various embodiments of the present invention may be combined. By way of example only, after the "if-instructions" routine has been executed (see FIG. 10) and certain control flow paths, or at least subsets thereof, have been identified as viable candidates for elimination, the cost of elimination and/or the possibility of merging these candidate control flow paths, or at least subsets thereof, with a selected or created control flow path, or subset/branch thereof, may be determined in accordance with the previously mention procedures and principles.

Figure 12:
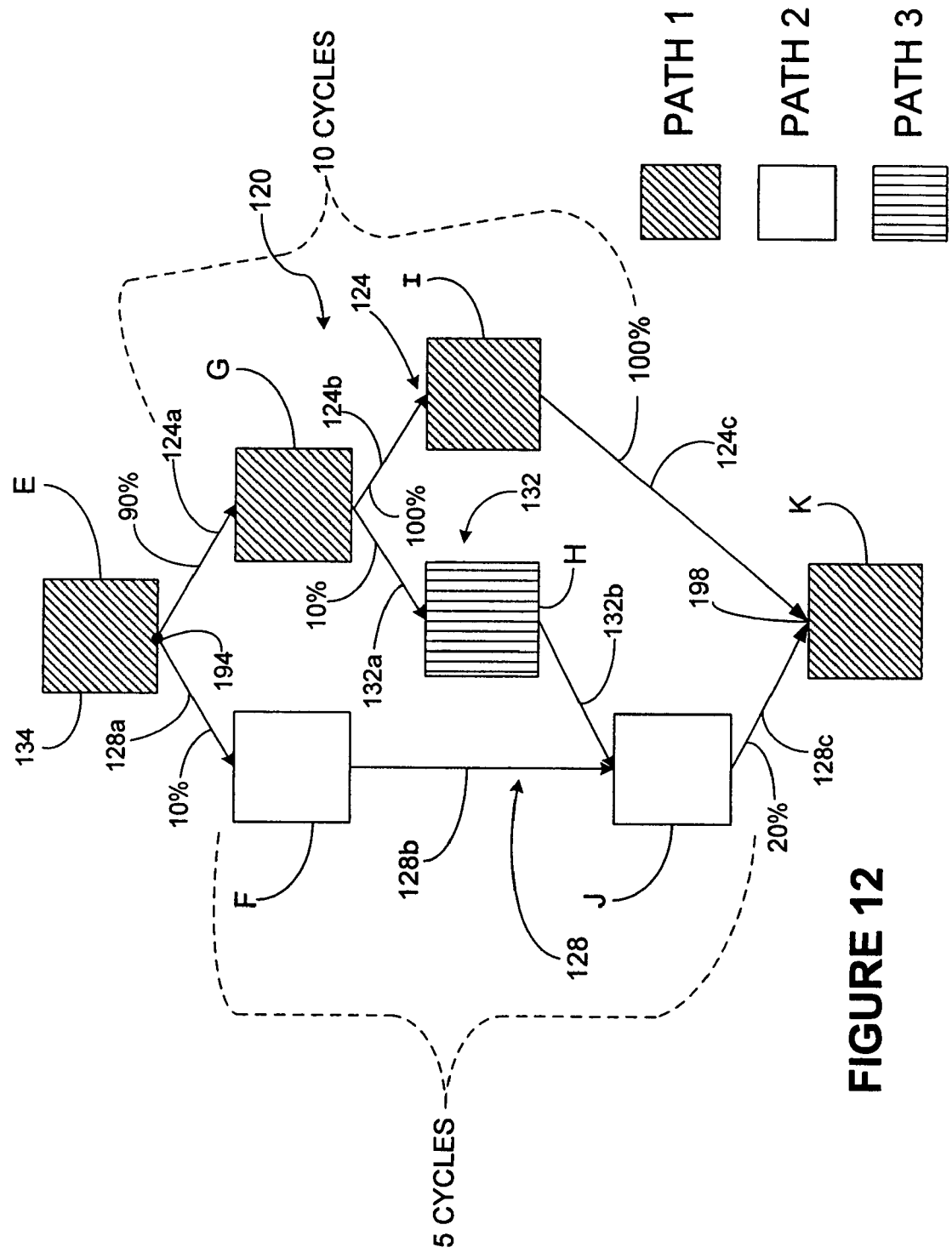
FIG. 12 is a further basic block assembly for illustrating embodiments of the present invention.

Referring in detail now to FIG. 12 for assisting in providing a further explanation of various embodiments of the present invention, there is seen the assembly of computer control branches including control flow paths, which has been generally illustrated as 120. As previously mentioned, the assembly of control flow paths 120 may comprises a scheduling region of a computer program where the compilation system 40, more particularly the compiler optimizer 60 including its associated instruction scheduler 50, operates on the instructions of the control flow path assembly 120. As also seen in FIG. 9, the control flow path assembly 120 includes basic blocks E, F, G, H, I, J and K, representing three(3) control flow paths, more specifically, control flow paths 124, 128, and 132, respectively including subset control flow paths 124a, 124b, 124c, and subset control flow paths 128a, 128b, 128c, and subset control flow paths 132a and 132b. Basic block E represents an entry basic block of the scheduling region, and basic block K represents an exit basic block of the scheduling region. As shown in FIG. 12, control flow path 124 starts with the entry basic block E, continues through basic blocks G and I and terminates with the exit basic block K. Similarly, control flow path 128 comprises basic block F and J. As also show in FIG. 9, flow control path 132 in FIG. 12 contains basic block H. For further purposes of explanation, empirically derived information showing a 10% probability or predictive ratio that subset control flow path 128a will be chosen or taken is assumed based on instructions produced by basic block E. Consequentially, a 90% probability would then result that subset control flow path 124a will be chosen or taken. It is also assumed that basic blocks G and I of control flow path 124, and control flow path 128 including basic blocks F and J, have a resource height of 10 cycles and 5 cycles, respectively. The total resource height, or weighted resource height, for basic blocks F and J of control flow path 124, and control flow path 128 including basic blocks F and J, in an unmerged, separate state would be 0.50 cycles (i.e., (0.10)(5 cycles)) plus 9.0 cycles (i.e., (0.90)(10 cycles)), or 9.5 cycles. The same procedure as previously illustrated for the control flow paths and instructions in FIG. 7 may be employed for determining dependence height and weighted dependence height for basic blocks G and I of control flow path 124, and of control flow path 128 including basic blocks F and J. Thus, assuming control flow path 128 including basic blocks F and J has a 2 cycle dependence height, and further assuming the subset basic blocks G and I of control flow path 124 has a 10 cycle dependence height, the total dependence height for basic blocks G and I of control flow path 124 and control flow path 128 (including basic blocks F and J) in an unmerged, separate state would be 0.20 cycles (i.e., (0.10)(2 cycles)) plus 9.0 cycles (i.e., (0.90)(10 cycles)), or 9.2 cycles.

To determine the total or combined resource height for when the basic blocks G and I of control flow path 124 and basic blocks F and J of control flow path 128 are merged, the same procedure that was used for the illustrations of FIGS. 5 and 6 may be employed. Assuming from an empirical determination that basic blocks G and I of control flow path 124 and basic blocks F and J of control flow path 128 would take 12 cycles for execution, the total weighted resource height for the merger would equal 90%(12 cycles) plus 10%(12 cycles), or 10.8 cycles plus 1.2 cycles, or 12 cycles. Furthermore, the increase in resource height would be 12 cycles minus(−) 9.5 cycles, or 2.5 cycles. Stated alternatively, the increase in resource height, or incremental change in resource height, as a result of merging basic blocks G and I of control flow path 124 and basic blocks F and J of control flow path 128 would be the weighted resource height of the merged control flow paths including the associated stated basic blocks minus or less the additive/combined weighted resource heights of the respective control flow paths not merged or in singular status.

To determine the total or combined dependence height for when the basic blocks G and I of control flow path 124 and basic blocks F and J of control flow path 128 are merged, the same procedure that was used for the illustrations of FIGS. 7 and 8 may be employed. Assuming from an empirical determination that basic blocks G and I of control flow path 124 and basic blocks F and J of control flow path 128 would take 10 cycles for execution, the total weighted dependence height for the merger would equal 90%(10 cycles) plus 10%(10 cycles), or 9.0 cycles plus 1.0 cycles, or 10 cycles. Furthermore, the increase in dependence height would be 10 cycles minus(−) 9.2 cycles, or 0.8 cycles. Stated alternatively, the increase in dependence height, or incremental change in dependence height, as a result of merging basic blocks G and I of control flow path 124 with basic blocks F and J of control flow path 128 would be the weighted dependence height of the merged control flow paths including the associated stated basic blocks minus or less the additive/combined weighted dependence heights of the respective control flow paths not merged or in singular status.

As previously indicated, the cost of any branch instruction is a function of the frequency of execution of the branch instruction, the ability of the microprocessor to predict the branch target correctly, and the penalties associated with incorrect or correct mispredictions. With respect to the control flow path assembly 120 of FIG. 12, the cost of the branch instruction that will be eliminated by merging the subset basic blocks G and I of control flow path 124 with basic blocks F and J of control flow path 128 e.g. the branch "b" terminating the entry basic block E, may be determined from the previously set forth source code:

$$\text{BranchCost}(b) = (TR(b) \times (1 - MPR(b) \times CPTBP(m)) + (MPR(b) \times MPP(m)))$$

where: TR(b) is the used or taken ratio (predictive ratio) of Branch(b);

MPR(b) is the mispredict ratio of Branch(b);

CPTBP(m) is the correctly predicted taken branch penalty in cycles for a microprocessor m; and MPP(m) is the mispredict penalty in cycles for microprocessor m.

Typically, the compilation system 40 has access to all ratios and cycles, except the mispredict ratio of a branch instruction. For various embodiments of the present invention and as previously suggested, the following formula is employed to estimate MPR(b) from TR(b):

$$MPR(b) = -1.04357 \times TR(b)^2 + 1.1987 \times TR(b) + 0.0112$$

As previously mentioned, the resource height increase computes the difference in resource height of the combined control flow path and the weighted resource height of the control flow paths if they are separate. Suitable source code for this procedure is:

Resource Height Increase=mergedResHeight−
(path1ResHeight*path1Fraction)−
(path2ResHeight*path2Fraction)

As also previously mentioned, the dependence height increase computes the increase in dependence height between a split point (e.g., point 194 in FIG. 12) and a merge point (e.g., point 198 in FIG. 12) of the control flow paths, more specifically two control flow paths, relative to the weight dependence height of the control flow paths, or subsets/branches, thereof if they are separate. Suitable source code for this procedure is:

Dependence Height Increase=max (path1Height, path2Height)−(path1Height*path1Fraction)−
(path2Height*path2Fraction)

If the cost in cycles of a computer program branch instruction (e.g., branch instruction 134, a branch instruction terminating basic block E) is greater than the increase in resource height, or the increase in dependence height, then it is beneficial to combine control flow paths(e.g. to combine basic blocks G and I of control flow path 124 with control flow path 128 including its associated basic blocks F and J). Thus, if the computer program branch cost in cycles minus (−) the resource height increase, or the dependence height increase, is greater than zero(0), then it is beneficial to merge the control flow paths and eliminate the computer program branch instruction. As was previously seen for the example employing the illustrations of FIGS. 5–8, a comparison is made between the resource height increase and the dependence height increase to determine which of the two is the largest. After this determination has been made, then the larger of the two is used to determine if it is beneficial to merge control flow paths. Therefore, if the cost in cycles of a computer program branch instruction (e.g., branch instruction 134 of basic block E) is greater than the largest of, or the largest between, the resource height increase and dependence height increase for the combined control flow paths (e.g., the basic blocks G and I of control flow path 124, in combination with the basic blocks F and J of control flow path 128), then it would be beneficial to merge the two control flow paths. Stated alternatively, the final benefit would essentially be the cost of all branches eliminated by merging control flow paths (e.g., two control flow paths) minus or less the largest of the increase in dependence height and the increase in resource height, as the result of merging the control flow paths (e.g., the result of merging the two control flow paths).

Figure 13:
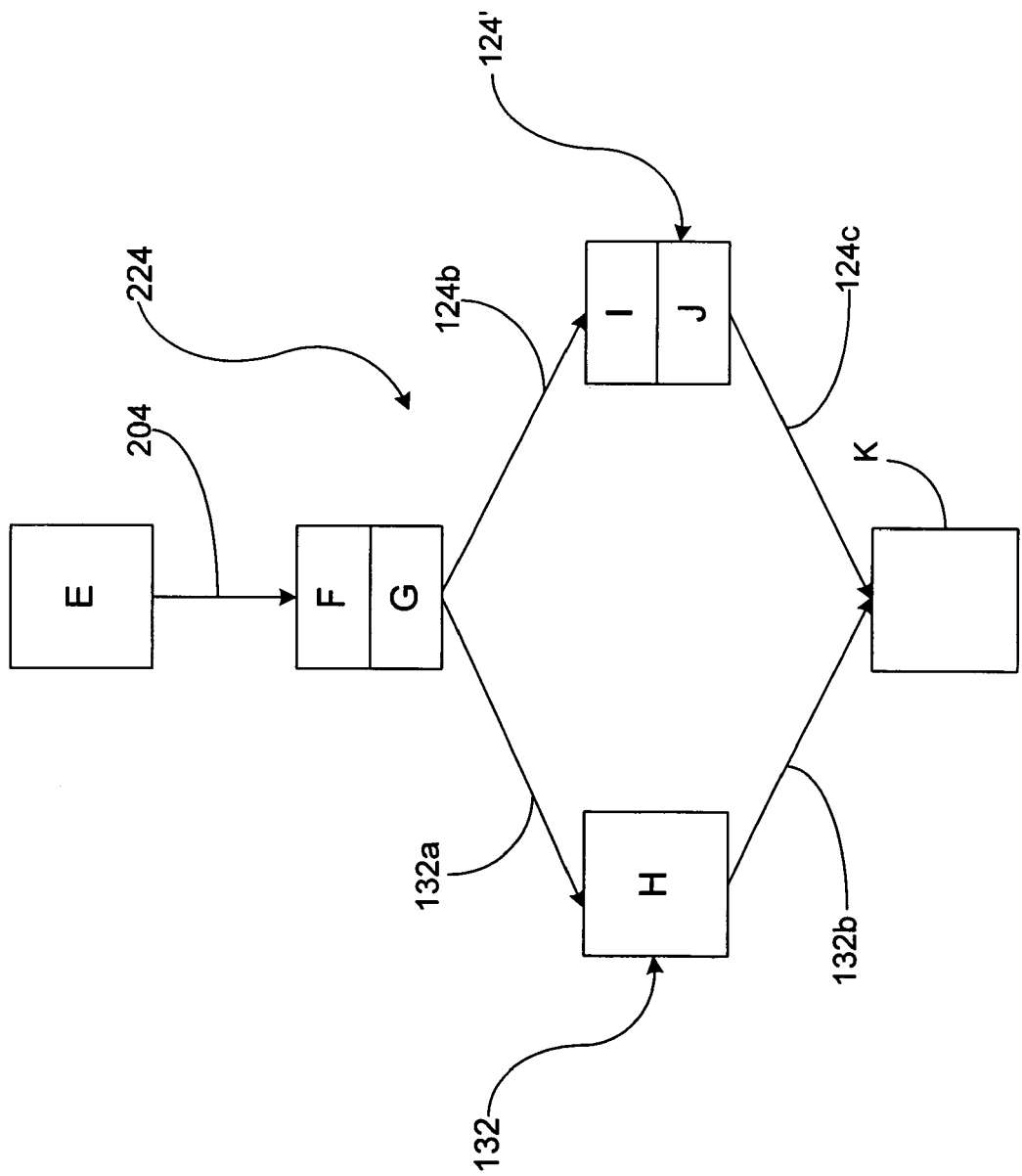
FIG. 13 is an illustration of the basic block assembly after control flow paths have been combined or merged.

For the computer program branch instruction 134 terminating basic block E in FIG. 12, TR(b) would equal 0.10, MPR(b) would equal 0.90, CPTBP(m) would equal 5 cycles, and MPP(m) would equal 10 cycles. The cost in cycles then for executing the computer program branch instruction 134 would then be equal to (0.10×((1−0.90)×5 cycles)+(0.90×9 cycles), or 0.05 cycles+8.1 cycles, or 8.1 5 cycles. In one embodiment of the invention, the computer program branch cost and the resource height increase are used to determine if it is beneficial to merge control flow paths. If the computer program branch cost is greater than the resource height increase, then there is benefit in the merger. Thus, for the subset basic blocks G and I of control flow path 124, and for basic blocks F and J of control flow path 128 in FIG. 12, the resource height increase of 2.5 cycles is used in combination with the computer program branch cost of 8.15 cycles for computer program branch instruction 134 to determine if it is beneficial to merge the subset basic blocks G and I of control flow path 124, with basic blocks F and J of control flow path 128. More particularly, since the computer program branch cost of 8.15 cycles is greater than the resource height increase of 2.5 cycles, it would then be beneficial to combine basic blocks G and I of control flow path 124, with basic blocks F and J of control flow path 128 to obtain a merged single subset control flow path, identified in FIG. 13 as control flow path 204 terminating in merged basic block F-G (as best shown in FIG. 13), and to further obtain control flow path 124' having merged basic block I-J. The final or total benefit of this merger would be the benefit of eliminating program branch instruction 134 from basic block E (i.e., 8.15 cycles) minus(−) the resource height increase (i.e., 2.5 cycles), or 5.65 cycles. Therefore, stated alternatively, the total of the final benefit for a merger of the subset basic blocks G and I of control flow path 124, with control flow path 128 (including basic blocks F and J), would be the benefit of eliminating computer program branch instruction 134, or the cost for executing computer program branch instruction 134, minus(−) the resource height increase. After the merger and as best illustrated in FIG. 13, computer program branch instruction 134 has been eliminated from basic block E.

In another embodiment of the present invention, the computer program branch cost and the dependence height increase are used to determine if it is beneficial to merge control flow paths. If the computer program branch cost is greater than the dependence height increase, then there is benefit in the merger. Thus, for subset basic blocks G and I of control flow path 124, and for basic blocks F and J of control flow path 128, the dependence height increase of 0.8 cycles is used in combination with the computer program branch instruction 134 cost of 8.15 cycles to determine if it is beneficial to merge the subset basic blocks G and I of control flow path 124 with basic blocks F and J of control flow path 128. More particularly, since the computer program branch cost of 8.15 cycles is greater than the dependence height increase of 0.8 cycles, it would then be beneficial to combine basic blocks G and I of control flow path 124 and basic blocks F and J of control flow path 128 to obtain or produce a merged single control flow path 204 terminating in merged basic blocks F-G as shown in FIG. 13, along with a control flow path 124' containing merged basic block I-J, all being part of a control flow assembly, generally illustrated as 224 in FIG. 13. The final or total benefit of this merger would be the benefit of eliminating program branch instruction 134 (i.e., 8.15 cycles) minus(−) the dependence height increase (i.e., 0.8 cycles), or 7.35 cycles. Therefore, the total of the final benefit for a merger of basic blocks G and I of control flow path 124 with basic blocks F and J of control flow path 128, would be the benefit of eliminating computer program branch instruction 134 from basic block E, or the cost for executing computer program branch instruction 134, minus (−) the dependence height increase.

In another embodiment of the present invention, a comparison is made between the increase in resource height and the increase in dependence height. More specifically, to determine the final benefit of merging control flow paths, the computer branch cost in cycles is used in combination with the largest cycle value between the resource height increase or the dependence height increase is selected. Thus, if the cycle value of the resource height increase is larger than the cycle value of the dependence height increase, the cycle value for the resource height increase is selected for determining the final benefit of merging control flow paths. If the cycle value of the dependence height increase is larger than the cycle value of the resource height increase, the cycle value for the dependence height increase is selected for determining the final benefit of merging control flow paths. For the example of FIG. 12, the resource height increase of 2.5 cycles is larger than the dependence height increase of 0.8 cycles. Thus, 2.5 cycles is selected for determining the final benefit of merging control flow paths. The final or total benefit of the merger for this embodiment of the present invention would be the benefit of eliminating program branch instruction 134 from basic block E (i.e., 8.15 cycles) minus(−) the dependence height increase (i.e., 2.5 cycles), or 5.65 cycles.

Continuing to refer to FIG. 13 and as previously indicated, merging basic blocks G and I of control flow path 124 with basic blocks F and J of control flow path 128 results in control flow path 204 and merged basic block F–G, along with control flow path 124' containing merged basic block I–J. The control flow assembly 224 in FIG. 13 further includes basic block H and basic block K. Thus, the two(2) remaining control flow paths of control flow path assembly 224 following merged basic block F–G are control flow path 132 and control flow path 124'. As indicated, merged blocks F–G and I–J were created by combining the contents of basic blocks F and G and basic blocks I and J, respectively, when merging basic blocks G and I of control flow path 124 with basic blocks F and J of flow path 128. The resulting control flow assembly 224 comprises basic block E, merged basic block F–G, control flow path 124' including merged basic block I–J and basic block K, and control flow path 132 including basic block H. The previously described methods maybe used to determine if it is beneficial to combine merged basic block I–J of control flow path 124' with basic block H of control flow path 132. The process of branch elimination and/or control flow path mergers continues until there are no more control flow paths that can be profitably combined. The source code for testing and determining whether or not control flow paths or subset/branches of control flow paths should be merged or combined is as follows:

```
performPathSelection( );
Boolean change = TRUE;
while ( change ) {
    change = FALSE;
    for ( curPath = each selected path in the region ) {
        for ( candPath = each selected path in the region ) {
            // if neither path has been modified since the last
            // time don't bother trying to combine them again
            if ( !curPath.modified( ) && !candPath.modified( ) )
```

-continued

```
                continue;
            // if we determine that it is both possible
            // and beneficial to combine these control-flow
            // paths, then do so.
            if ( canCombine(curPath,candPath) &&
                    beneficialToCombine( curPath, candPath ) {
                combine(curPath, candPath);
                curPath.modified(TRUE) ;
                change = TRUE;
            }
    }
}
```

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for selecting a basic block to a control flow path in a computer program by use of a compiler optimizer in a computer, the method comprising:
   providing, the computer, a computer program including an entry basic block and a plurality of basic blocks forming control flow paths;
   determining that immediate subsets of the control flow paths commencing with the entry basic block are biased subsets, wherein the biased subsets comprises predictive ratios that differ by more than a threshold value, wherein a predictive ratio is a probability that the computer will execute instructions of a control flow path; and
   selecting a most frequent successive basic block in a most biased subset of the control flow paths to produce a selected basic block, wherein the most biased subset is a first subset having a higher probability of execution than a second subset in the immediate subsets.

2. A method for selecting a basic block to a control flow path in a computer program by use of a compiler optimizer in a computer, the method comprising:
   providing, the computer, a computer program including an entry basic block and a plurality of basic blocks forming control flow paths;
   determining that immediate subsets of the control flow paths commencing with the entry basic block are essentially unbiased subsets, wherein the unbiased subsets comprises predictive ratios that do not differ above a threshold value, wherein a predictive ratio is a probability that the computer will execute instructions of a control flow path; and
   selecting a basic block with a shortest height to produce a selected basic block, wherein a height comprises a number of cycles that a computer system takes to execute the instructions in each basic block on a control flow path or takes into account any latency among instructions of a basic block or instructions from another basic block.

3. The method of claim 2 wherein said height is a height selected from a group of heights consisting of resource height and dependence height.

4. The method of claim 3 additionally comprising determining that a basic block in one control flow path has a shorter resource height, and determining that a basic block in another control flow path has a shorter dependence height.

5. The method of claim 4 additionally comprising selecting as the selected basic block the basic block having the shorter resource height.

6. A method for selecting a basic block to a control flow path in a computer program by use of a compiler optimizer in a computer, the method comprising:
   providing, the computer, a computer program including an entry basic block and a plurality of basic blocks forming control flow paths;
   determining that immediate subsets of the control flow paths commencing with the entry basic block are essentially unbiased subsets, wherein the unbiased subsets comprises predictive ratios that do not differ above a threshold value, wherein a predictive ratio is a probability that the computer will execute instructions of a control flow path;
   determining that the basic blocks in the immediate subsets of the flow control paths have essentially a same height, wherein a height comprises a number of cycles that a computer system takes to execute the instructions in each basic block on a control flow path or takes into account any latency among instructions of a basic block or instructions from another basic block; and
   selecting any one of the basic blocks in the immediate subsets of the flow control flow paths.

7. The method of claim 6 wherein said height is a height selected from a group of heights consisting of resource height and dependence height.

8. A method for selecting a basic block to a control flow path in a computer program by use of a compiler optimizer in a computer, the method comprising:
   providing, the computer, a computer program including an entry basic block and a plurality of basic blocks forming control flow paths; and
   selecting a basic block from the entry basic block in accordance with an if-instruction selected from a group of if-instructions consisting of:
   (i) if immediate subsets of control flow paths commencing with the entry basic block are biased subsets, wherein the biased subsets comprises predictive ratios that differ by more than a threshold value, wherein a predictive ratio is a probability that the computer will execute instructions of a control flow path, then selecting a most frequent successive basic block in a most biased subset of the control flow paths to produce a selected basic block, wherein the most biased subset is a first subset having a higher probability of execution than a second subset in the immediate subsets,
   (ii) if immediate subsets of control flow paths commencing from the entry basic block are essentially unbiased subsets, wherein the unbiased subsets comprises predictive ratios that do not differ above a threshold value, wherein a predictive ratio is a probability that the computer will execute instructions of a control flow path, then selecting a basic block with a shortest height to produce a selected basic block, wherein a height comprises a number of cycles that a computer system takes to execute the instructions in each basic block on a control flow path or takes into account any latency among instructions of a basic block or instructions from another basic block,
   (iii) if immediate subsets of control flow paths commencing from the entry basic block are essentially unbiased subsets, and if the basic blocks in the immediate subsets of flow control flow paths have essentially the same height, then selecting any one of the basic blocks in the immediate subsets of the flow control flow paths, and (iv) if immediate subsets of control flow paths commencing from the entry basic block contain no basic block selected in accordance with the if-instruction of subparagraph (i) or the if-instruction of subparagraph (ii) or the if-instruction of subparagraph (iii), then selecting a basic block not assigned in any immediate subset of the control flow paths to produce a selected basic block.

9. The method of claim 8 wherein said providing a computer program additionally comprises providing the computer program with a scheduling region having the entry basic block and an exit basic block and having the basic blocks between the entry basic block and the exit basic block.

10. The method of claim 8 wherein if immediate subsets of control flow paths commencing from the entry basic block contain no basic block selected in accordance with the if-instruction of subparagraph (i) or the if-instruction of subparagraph (ii) or the if-instruction of subparagraph (iii), select a frequently executed basic block not assigned in any immediate subset of the control flow paths to produce a selected basic block.

11. The method of claim 9 wherein if immediate subsets of control flow paths commencing from the entry basic block contain no basic block selected in accordance with the if-instruction of subparagraph (i) or the if-instruction of subparagraph (ii) or the if-instruction of subparagraph (iii), select a frequently executed basic block not assigned in any immediate subset of the control flow paths to produce a selected basic block.

12. The method of claim 8 wherein if immediate subsets of control flow paths commencing from the entry basic block contain no basic block selected in accordance with the if-instruction of subparagraph (i) or the if-instruction of subparagraph (ii) or the if-instruction of subparagraph (iii), select a most frequently executed basic block not assigned in any immediate subset of the control flow paths to produce a selected basic block.

13. The method of claim 9 wherein if immediate subsets of control flow paths commencing from the entry basic block contain no basic block selected in accordance with the if-instruction of subparagraph (i) or the if-instruction of subparagraph (ii) or the if-instruction of subparagraph (iii), select a most frequently executed basic block not assigned in any immediate subset of the control flow paths to produce a selected basic block.

14. A method for forming a computer control flow path in a computer program by use of a compiler optimizer in a computer, the method comprising the steps:

(a) providing, in a computer, a computer program having a plurality of basic blocks forming control flow paths;

(b) selecting a basic block in accordance with an if-instruction selected from a group of if-instructions consisting of:

(i) if immediate subsets of control flow paths are biased subsets, wherein the biased subsets comprises predictive ratios that differ by more than a threshold value, wherein a predictive ratio is a probability that the computer will execute instructions of a control flow path, then selecting a most frequent successive basic block in a most biased subset of the control flow paths to produce a selected basic block, wherein the most biased subset is a first subset having a higher probability of execution than a second subset in the immediate subsets, (ii) if immediate subsets of control flow paths are essentially unbiased subsets, wherein the unbiased subsets comprises predictive ratios that do not differ above a threshold value, wherein a predictive ratio is a probability that the computer will execute instructions of a control flow path, then selecting a basic block with a shortest height to produce a selected basic block, wherein a height comprises a number of cycles that a computer system takes to execute the instructions in each basic block on a control flow path or takes into account any latency among instructions of a basic block or instructions from another basic block, (iii) if immediate subsets of control flow paths commencing are essentially unbiased subsets, and if the basic blocks in the immediate subsets of flow control flow paths have essentially the same height, select any one of the basic blocks in the immediate subsets of the flow control flow paths, and (iv) if immediate subsets of control flow paths contain no basic block selected in accordance with the if-instruction of subparagraph (i) or the if-instruction of subparagraph (ii) or the if-instruction of subparagraph (iii), select a basic block not assigned in any immediate subset of the control flow paths.

15. The method of claim 14 additionally comprising commencing the immediate subsets of the control flow paths from an entry basic block.

16. The method of claim 14 additionally comprising repeating step (b) to produce a plurality of selected basic blocks to form a computer flow control path.

17. The method of claim 15 additionally comprising repeating step (b) to produce a plurality of selected basic blocks to form a computer flow control path.

18. The method of claim 14 wherein said providing a computer program additionally comprises providing the computer program with a scheduling region having an entry basic block and exit basic block and having the basic blocks between the entry basic block and the exit basic block of the scheduling region.

19. The method of claim 14 wherein if immediate subsets of control flow paths contain no basic block selected in accordance with the if-instruction of subparagraph (i) or the if-instruction of subparagraph (ii) or the if-instruction of subparagraph (iii), select a frequently executed basic block not assigned in any immediate subset of the control flow paths to produce a selected basic block.

20. The method of claim 15 wherein if immediate subsets of control flow paths commencing from the entry basic block contain no basic block selected in accordance with the if-instruction of subparagraph (i) or the if-instruction of subparagraph (ii) or the if-instruction of subparagraph (iii), select a frequently executed basic block not assigned in any immediate subset of the control flow paths to produce a selected basic block.

21. The method of claim 14 wherein if immediate subsets of control flow paths contain no basic block selected in accordance with the if-instruction of subparagraph (i) or the if-instruction of subparagraph (ii) or the if-instruction of subparagraph (iii), select a most frequently executed basic block not assigned in any immediate subset of the control flow paths to produce a selected basic block.

22. The method of claim 15 wherein if immediate subsets of control flow paths commencing from the entry basic block contain no basic block selected in accordance with the if-instruction of subparagraph (i) or the if-instruction of subparagraph (ii) or the if-instruction of subparagraph (iii), select a most frequently executed basic block not assigned in any immediate subset of the control flow paths to produce a selected basic block.

23. A basic block produced in accordance with the method of claim 1.

24. A basic block produced in accordance with the method of claim 2.

25. A basic block produced in accordance with the method of claim 6.

26. A basic block produced in accordance with the method of claim 8.

27. A computer control flow path produced in accordance with the method of claim 14.

28. A computer control flow path produced in accordance with the method of claim 16.

29. An article of manufacture comprising:
a computer-readable storage medium having instructions for selecting, in a computer program having control flow paths in a computer, a basic block from an entry basic block in accordance with an if-instruction selected from a group of if-instructions consisting of:
 (i) if immediate subsets of control flow paths commencing with the entry basic block are biased subsets, wherein the biased subsets comprises predictive ratios that differ by more than a threshold value, wherein a predictive ratio is a probability that the computer will execute instructions of a control flow path, then selecting a most frequent successive basic block in a most biased subset of the control flow paths to produce a selected basic block, wherein the most biased subset is a first subset having a higher probability of execution than a second subset in the immediate subsets,
 (ii) if immediate subsets of control flow paths commencing from the entry basic block are essentially unbiased subsets, wherein the unbiased subsets comprises predictive ratios that do not differ above a threshold value, wherein a predictive ratio is a probability that the computer will execute instructions of a control flow path, select a basic block with a shortest height to produce a selected basic block,
 (iii) if immediate subsets of control flow paths commencing from the entry basic block are essentially unbiased subsets, and if the basic blocks in the immediate subsets of flow control flow paths have essentially the same height, select any one of the basic blocks in the immediate subsets of the flow control flow paths, wherein a height comprises a number of cycles that a computer system takes to execute the instructions in each basic block on a control flow path or takes into account any latency among instructions of a basic block or instructions from another basic block, and
 (iv) if immediate subsets of control flow paths commencing from the entry basic block contain no basic block selected in accordance with the if-instruction of subparagraph (i) or the if-instruction of subparagraph (ii) or the if-instruction of subparagraph (iii), select a basic block not assigned in any immediate subset of the control flow paths to produce a selected basic block.

30. An article of manufacture comprising:
a computer-readable storage medium having instructions for
(a) selecting, from a computer program having a plurality of basic blocks forming control flow paths in a computer, a basic block in accordance with an if-instruction selected from a group of if-instructions consisting of:
 i) if immediate subsets of control flow paths are biased subsets, wherein the biased subsets comprises predictive ratios that differ by more than a threshold value, wherein a predictive ratio is a probability that the computer will execute instructions of a control flow path, then selecting a most frequent successive basic block in a most biased subset of the control flow paths to produce a selected basic block, wherein the most biased subset is a first subset having a higher probability of execution than a second subset in the immediate subsets,
 (ii) if immediate subsets of control flow paths are essentially unbiased subsets, wherein the unbiased subsets comprises predictive ratios that do not differ above a threshold value, wherein a predictive ratio is a probability that the computer will execute instructions of a control flow path, select a basic block with a shortest height to produce a selected basic block, wherein a height comprises a number of cycles that a computer system takes to execute the instructions in each basic block on a control flow path or takes into account any latency among instructions of a basic block or instructions from another basic block,
 (iii) if immediate subsets of control flow paths commencing are essentially unbiased subsets, and if the basic blocks in the immediate subsets of flow control flow paths have essentially the same height, select any one of the basic blocks in the immediate subsets of the flow control flow paths, and
 (iv) if immediate subsets of control flow paths contain no basic block selected in accordance with the if-instruction of subparagraph (i) or the if-instruction of subparagraph (ii) or the if-instruction of subparagraph (iii), select a basic block not assigned in any immediate subset of the control flow paths;
(b) repeating said selecting step of paragraph (a) to produce a plurality of selected basic blocks and form a computer flow control path.

31. A computer system comprising a computer executing a computer program having flow control paths and a selected basic block selected from an entry basic block in accordance with an if-instruction selected from a group of if-instructions consisting of:
 (i) if immediate subsets of control flow paths commencing with the entry basic block are biased subsets, wherein the biased subsets comprises predictive ratios that differ by more than a threshold value, wherein a predictive ratio is a probability that the computer will execute instructions of a control flow path, then selecting a most frequent successive basic block in a most biased subset of the control flow paths to produce a selected basic block, wherein the most biased subset is a first subset having a higher probability of execution than a second subset in the immediate subsets,
 (ii) if immediate subsets of control flow paths commencing from the entry basic block are essentially unbiased subsets, wherein the unbiased subsets comprises predictive ratios that do not differ above a threshold value, wherein a predictive ratio is a probability that the computer will execute instructions of a control flow path, select a basic block with a shortest height to produce a selected basic block, wherein a height comprises a number of cycles that a computer system takes to execute the instructions in each basic block on a control flow path or takes into account any latency among instructions of a basic block or instructions from another basic block,
 (iii) if immediate subsets of control flow paths commencing from the entry basic block are essentially unbiased subsets, and if the basic blocks in the immediate subsets of flow control flow paths have essentially the same height, select any one of the basic blocks in the immediate subsets of the flow control flow paths, and (iv) if immediate subsets of control flow paths commencing from the entry basic block contain no basic block selected in accordance with the if-instruction of subparagraph (i) or the if-instruction of subparagraph (ii) or the if-instruction of subparagraph (iii), select a basic block not assigned in any immediate subset of the control flow paths to produce a selected basic block.

32. A computer system comprising a computer executing a computer program including a computer flow control path formed from a plurality of selected basic blocks having been selected in accordance with an if-instruction selected from a group of if-instructions consisting of:

(i) if immediate subsets of control flow paths are biased subsets, wherein the biased subsets comprises predictive ratios that differ by more than a threshold value, wherein a predictive ratio is a probability that the computer will execute instructions of a control flow path, select a most frequent successive basic block in a most biased subset of the control flow paths to produce a selected basic block, wherein the most biased subset is a first subset having a higher probability of execution than a second subset in the immediate subsets, (ii) if immediate subsets of control flow paths are essentially unbiased subsets, wherein the unbiased subsets comprises predictive ratios that do not differ above a threshold value, wherein a predictive ratio is a probability that the computer will execute instructions of a control flow path, select a basic block with a shortest height to produce a selected basic block, wherein a height comprises a number of cycles that a computer system takes to execute the instructions in each basic block on a control flow path or takes into account any latency among instructions of a basic block or instructions from another basic block, (iii) if immediate subsets of control flow paths commencing are essentially unbiased subsets, and if the basic blocks in the immediate subsets of flow control flow paths have essentially the same height, select any one of the basic blocks in the immediate subsets of the flow control flow paths, and (iv) if immediate subsets of control flow paths contain no basic block selected in accordance with the if-instruction of subparagraph (i) or the if-instruction of subparagraph (ii) or the if-instruction of subparagraph (iii), select a basic block not assigned in any immediate subset of the control flow paths.

33. The method of claim 1, further comprising:
if the immediate subsets of the control flow paths commencing with the entry basic block are essentially unbiased subsets, wherein the unbiased subsets comprises predictive ratios that do not differ above the threshold value, wherein a predictive ratio is a probability that the computer will execute instructions of a control flow path, then selecting a basic block with the shortest height to produce a selected basic block, wherein a height comprises a number of cycles that a computer system takes to execute the instructions in each basic block on a control flow path or takes into account any latency among instructions of a basic block or instructions from another basic block.

34. The method of claim 1, wherein the most frequent successive block is in a first subset control path with a higher probability of instruction execution than a second subset control path.

35. The method of claim 2, wherein the most frequent successive block is in a first subset control path with a higher probability of instruction execution than a second subset control path.

36. The method of claim 2, further comprising:
determining the shortest height by testing all heights of the blocks in the immediate subsets.

37. The method of claim 6, wherein the most frequent successive block is in a first subset control path with a higher probability of instruction execution than a second subset control path.

38. The method of claim 6, further comprising:
determining the shortest height by testing all heights of the blocks in the immediate subsets.

39. The method of claim 8, wherein the most frequent successive block is in a first subset control path with a higher probability of instruction execution than a second subset control path.

40. The method of claim 8, further comprising:
determining the shortest height by testing all heights of the blocks in the immediate subsets.

41. The method of claim 14, wherein the most frequent successive block is in a first subset control path with a higher probability of instruction execution than a second subset control path.

42. The method of claim 14, further comprising:
determining the shortest height by testing all heights of the blocks in the immediate subsets.

43. The article of claim 29, wherein the most frequent successive block is in a first subset control path with a higher probability of instruction execution than a second subset control path.

44. The article of claim 29, further comprising:
determining the shortest height by testing all heights of the blocks in the immediate subsets.

45. The article of claim 30, wherein the most frequent successive block is in a first subset control path with a higher probability of instruction execution than a second subset control path.

46. The article of claim 30, further comprising:
determining the shortest height by testing all heights of the blocks in the immediate subsets.

47. The article of claim 31, wherein the most frequent successive block is in a first subset control path with a higher probability of instruction execution than a second subset control path.

48. The article of claim 31, further comprising:
determining the shortest height by testing all heights of the blocks in the immediate subsets.

49. The article of claim 32, wherein the most frequent successive block is in a first subset control path with a higher probability of instruction execution than a second subset control path.

50. The article of claim 32, further comprising:
determining the shortest height by testing all heights of the blocks in the immediate subsets.

* * * * *